US012359470B2

(12) United States Patent
Ma et al.

(10) Patent No.: US 12,359,470 B2
(45) Date of Patent: Jul. 15, 2025

(54) MULTI-AXIS LATCHBOLT LOCK ASSEMBLY

(71) Applicant: Innovation Lock, LLC, Palm Beach Gardens, FL (US)

(72) Inventors: Alvin Ma, Irvine, CA (US); David R. Wachsman, Palm Beach Gardens, FL (US)

(73) Assignee: Innovation Lock, LLC, Palm Beach Gardens, FL (US)

( * ) Notice: Subject to any disclaimer, the term of this patent is extended or adjusted under 35 U.S.C. 154(b) by 0 days.

(21) Appl. No.: 18/195,964

(22) Filed: May 11, 2023

(65) Prior Publication Data

US 2023/0383575 A1 Nov. 30, 2023

Related U.S. Application Data

(60) Provisional application No. 63/346,347, filed on May 27, 2022.

(51) Int. Cl.
*E05B 65/46* (2017.01)
*E05B 15/10* (2006.01)
(Continued)

(52) U.S. Cl.
CPC ............ *E05B 65/46* (2013.01); *E05B 15/102* (2013.01); *E05B 65/52* (2013.01); *E05C 1/08* (2013.01); *E05C 1/085* (2013.01)

(58) Field of Classification Search
CPC ...... E05B 15/102; E05B 65/46; E05B 65/461; E05B 65/52; E05B 65/5215; E05B 65/523; E05B 65/5238; E05C 1/085; Y10T 292/1037; Y10T 292/0886; Y10T 292/0887; Y10T 292/0889; Y10T 292/089; Y10T 292/0891
See application file for complete search history.

(56) References Cited

U.S. PATENT DOCUMENTS

| | | | |
|---|---|---|---|
| 100,738 | A | 3/1870 | Dwight |
| 884,260 | A | 4/1908 | Boyd |

(Continued)

FOREIGN PATENT DOCUMENTS

| | | | |
|---|---|---|---|
| CA | 3128714 A1 * | 2/2022 | ............... E05C 1/08 |
| DE | 3233976 C1 | 8/1983 | |
| WO | 8300353 A1 | 2/1983 | |

OTHER PUBLICATIONS

U.S. Appl. No. 29/673,492, filed Dec. 14, 2018, William H. Bullwinkel.

(Continued)

*Primary Examiner* — Christopher J Boswell
(74) *Attorney, Agent, or Firm* — Michael J Porco; Gerald E Hespos

(57) ABSTRACT

A multi-axis latchbolt lock assembly for use with cabinet drawers, desk drawers and the like is provided. The lock assembly includes a housing, a driver, a latchbolt, and an endplate. When an appropriate key is inserted into a keyhole of a locking actuation member, rotation of the key will actuate the driver that subsequently actuates the latchbolt into a locked or unlocked position in a vertical direction. The latchbolt includes a bolt member and a latching wedge, wherein the latching wedge is coupled to the bolt member in a rotatable relationship.

20 Claims, 18 Drawing Sheets

(51) Int. Cl.
*E05B 65/52* (2006.01)
*E05C 1/08* (2006.01)

(56) References Cited

U.S. PATENT DOCUMENTS 1,342,728 A 6/1920 Welch
1,539,301 A 5/1925 Cooper
1,864,883 A 6/1932 Edward
1,938,112 A 12/1933 Schlage
1,965,336 A 7/1934 Fitz
2,032,821 A 3/1936 Carral
2,140,066 A 12/1938 White
2,275,362 A 3/1942 Golden et al.
2,720,102 A 10/1955 Spain
2,793,520 A * 5/1957 Candia .................. E05B 63/128 70/150
2,938,373 A 5/1960 Gray et al.
3,262,292 A 7/1966 Glass
3,340,709 A 9/1967 Callahan
3,345,838 A 10/1967 Russell et al.
3,423,968 A 1/1969 Foote
3,503,233 A 3/1970 Russell et al.
3,563,593 A 2/1971 Leier et al.
3,589,152 A 6/1971 Glass et al.
3,696,647 A 10/1972 Balicki
3,726,115 A 4/1973 Wellekens
3,863,475 A 2/1975 Foss
3,919,866 A * 11/1975 Lipschutz ............... E05B 17/04 70/81
3,933,015 A 1/1976 Balicki
4,003,227 A 1/1977 Casey
4,009,599 A 3/1977 Patriquin
4,012,928 A * 3/1977 Dauenbaugh ........... E05B 9/084 292/147
4,067,599 A 1/1978 Ohno
4,356,580 A 11/1982 Kurtz
4,418,554 A 12/1983 Wolfgang
4,476,699 A 10/1984 Dahlborg
4,565,080 A 1/1986 Kincaid et al.
4,617,810 A 10/1986 Fish et al.
4,630,457 A 12/1986 Kincaid et al.
4,672,827 A 6/1987 Craig
4,708,006 A 11/1987 Hodgson
4,756,638 A 7/1988 Neyret
4,768,360 A 9/1988 Foshee
4,793,163 A 12/1988 MacFarlane et al.
4,809,525 A 3/1989 Cox
4,899,563 A 2/1990 Martin
4,920,774 A 5/1990 Martin
5,010,753 A 4/1991 Boris
5,038,589 A 8/1991 Martin
5,101,649 A 4/1992 Duval
5,113,676 A * 5/1992 Panossian ............. E05B 15/102 70/462
5,121,619 A 6/1992 Martin
5,127,244 A 7/1992 Myers
D337,041 S 7/1993 Carl
5,251,467 A 10/1993 Anderson
5,255,544 A 10/1993 Wu
5,315,850 A 5/1994 Edeus et al.
5,345,794 A 9/1994 Jenks
5,492,206 A 2/1996 Shieh
5,499,518 A 3/1996 Shieh
5,548,981 A 8/1996 Kirk
5,590,555 A 1/1997 Kester et al.
5,615,566 A 4/1997 Brandt
5,657,652 A 8/1997 Martin
5,678,438 A 10/1997 Kolkman et al.
5,722,275 A 3/1998 Price et al.
5,737,950 A 4/1998 Yun-Bin
5,813,260 A 9/1998 Widen
5,819,889 A 10/1998 Shieh
5,873,272 A 2/1999 Thompson
D408,711 S 4/1999 Bianco
5,913,907 A 6/1999 Lee
5,970,760 A 10/1999 Shen
6,035,673 A 3/2000 Harrison
6,079,241 A 6/2000 Burleigh et al.
6,092,402 A 7/2000 Porcelli et al.
6,161,404 A 12/2000 Westwinkel
6,393,882 B1 5/2002 Higgins
6,523,379 B2 2/2003 Teskey
6,606,890 B1 8/2003 Widen
6,708,539 B1 3/2004 Widen
6,920,770 B2 7/2005 Lurie et al.
D525,110 S 7/2006 Beard et al.
RE39,364 E 10/2006 Brandt
7,178,372 B1 2/2007 Shen
7,308,809 B2 12/2007 Lu
7,340,928 B2 3/2008 Hoffman
RE41,188 E 4/2010 Lurie et al.
7,695,031 B2 4/2010 Jackson, Jr. et al.
7,716,958 B2 5/2010 Martin
7,836,735 B2 11/2010 Liu
7,849,720 B2 12/2010 Reese
7,874,189 B2 1/2011 Martin
7,895,867 B2 3/2011 Hsieh
7,918,111 B2 4/2011 Uliano
8,028,555 B2 10/2011 Lurie
D651,889 S 1/2012 Mahaffey et al.
D667,286 S 9/2012 Wu
D670,993 S 11/2012 Lin
8,444,100 B2 5/2013 Takahashi et al.
8,601,839 B1 * 12/2013 Liu ......................... E05B 55/12 70/151 R
8,646,297 B2 2/2014 Foti
8,776,557 B2 7/2014 Wang
8,842,422 B2 9/2014 Hung et al.
8,905,693 B2 12/2014 Coffland et al.
8,919,156 B1 12/2014 Liu
8,978,426 B2 3/2015 Wang
D733,520 S 7/2015 Barna
9,167,918 B2 10/2015 Leyden
9,234,369 B2 1/2016 Gupta et al.
9,267,310 B2 2/2016 Linnåsen et al.
9,435,144 B2 9/2016 Bullwinkel
9,524,626 B2 12/2016 Brühwiler et al.
9,593,509 B2 3/2017 Murray
D789,770 S 6/2017 Reeb et al.
9,816,289 B2 11/2017 Bullwinkel
D804,283 S 12/2017 Jasper
10,087,653 B2 10/2018 Bullwinkel
10,156,088 B2 12/2018 Bullwinkel et al.
10,184,270 B2 1/2019 Bullwinkel
D840,212 S 2/2019 Huang et al.
10,196,843 B2 * 2/2019 Hickman .................. E05C 1/02
10,208,510 B1 2/2019 Dyck
10,435,914 B2 10/2019 Ma
10,662,672 B2 5/2020 Bullwinkel
10,724,276 B2 7/2020 Ma et al.
D899,218 S 10/2020 Bullwinkel et al.
10,858,863 B2 * 12/2020 Johnston ............... E05B 47/026
11,124,988 B1 * 9/2021 Hanson ................... E05B 65/46
11,603,680 B2 3/2023 Ma et al.
D988,835 S 6/2023 Bullwinkel et al.
11,976,497 B2 * 5/2024 Bullwinkel ......... E05B 29/0026
2001/0045114 A1 11/2001 Sokurenko
2003/0019258 A1 1/2003 Irgens et al.
2005/0011237 A1 1/2005 Lurie et al.
2005/0011239 A1 1/2005 Lurie et al.
2005/0241348 A1 11/2005 Devecki
2005/0271494 A1 12/2005 Hidalgo et al.
2005/0279894 A1 12/2005 Sedon et al.
2006/0086162 A1 4/2006 Huang
2006/0157431 A1 7/2006 Nagelski et al.
2007/0175246 A1 8/2007 Hsai
2007/0227209 A1 10/2007 Massard et al.
2009/0071209 A1 3/2009 Lurie
2010/0031717 A1 2/2010 Lurie et al.
2010/0148524 A1 6/2010 Czerwinski, Jr. et al.
2010/0170309 A1 7/2010 Liu
2010/0212371 A1 8/2010 Foti
2011/0127795 A1 6/2011 Still et al.
2011/0132047 A1 6/2011 Terhaar et al.

(56) References Cited

U.S. PATENT DOCUMENTS

| | | | |
|---|---|---|---|
| 2011/0316325 | A1 | 12/2011 | Martin, III et al. |
| 2013/0105419 | A1 | 5/2013 | Kologe |
| 2014/0013813 | A1 | 1/2014 | Le |
| 2014/0037399 | A1 | 2/2014 | Hyatt |
| 2014/0298869 | A1 | 10/2014 | Wang |
| 2015/0176307 | A1 | 6/2015 | Bullwinkel |
| 2016/0281393 | A1 | 9/2016 | Bullwinkel et al. |
| 2017/0298651 | A1 | 10/2017 | Ma |
| 2017/0350163 | A1 | 12/2017 | Ma et al. |
| 2018/0038132 | A1 | 2/2018 | Bullwinkel |
| 2019/0145126 | A1 | 5/2019 | Wolfish et al. |
| 2021/0246935 | A1 | 8/2021 | Grewell et al. |
| 2022/0213719 | A1 | 7/2022 | Bullwinkel et al. |
| 2022/0356734 | A1 | 11/2022 | Bullwinkel et al. |
| 2024/0035312 | A1* | 2/2024 | Ma .......................... E05C 9/041 |

OTHER PUBLICATIONS

U.S. Appl. No. 29/782,823, filed May 10, 2021, William H. Bullwinkel.

Desk Lock + Door Puncher, posted May 6, 2019 [online], [retrieved Nov. 14, 2022]. Retrieved from internet, https://www.amazon.com/dp/B07RDJSS6W (Year: 2019).

Double Door Lock, posted Apr. 18, 2022 [online], [retrieved Nov. 14, 2022]. Retrieved from internet, https://www.amazon.com/Cabinet-Deadbolt-Door-Installation-Drilling-Diameter/dplB09Y51 MHVK (Year: 2022).

Olympus Ratchet Lock, posted Dec. 13, 2008 [online], [retrieved Feb. 27, 2023]. Retrieved from internet, https://www.arnazon.com/Olympus-Sliding-Ratchet-Keyed-Different/dp/B005WL056Q (Year: 2008).

* cited by examiner

Locked

Fully depressed in the vertical direction only

Retracted before drawer slides open.

MULTI-AXIS LATCHBOLT LOCK ASSEMBLY

PRIORITY

This application claims priority to U.S. Provisional Patent Application Ser. No. 63/346,347, filed May 27, 2022, the contents of which are hereby incorporated by reference in its entirety.

TECHNICAL FIELD

The present disclosure relates generally to lock mechanisms, and more particularly, to a multi-axis latchbolt lock assembly for use with cabinet drawers, desk drawers and the like.

BACKGROUND

Numerous types of core cylinders for locks are known and popularly used for various applications. In one application, a lock is provided to secure a drawer of a cabinet, desk or similar structure. In such application, a lock assembly is mounted through a hole or aperture of a drawer, and thus moves with the drawer when opened or closed. When the drawer is in a closed position, a bolt or latch projects from the lock assembly into an aperture, recess or other portion of the structure to secure the drawer in the closed position. To open the drawer, an appropriate key is inserted into the core cylinder and rotated to withdraw the bolt or latch into the lock assembly and from the portion of the structure, enabling the drawer to be opened.

Referring to FIGS. 1A through 2B, a conventional latchbolt lock 10 is illustrated, where FIG. 1A is a side view the lock 10 in the locked position, FIG. 1B is a front view of the lock 10 in the locked position, FIG. 2A is a side view of lock 10 in a fully depressed position and FIG. 2B is a front view of the lock 10 in a fully depressed position. Lock 10 includes a housing 12 with a bolt 16 that extends in a particular manner from the housing 12. The bolt 16 is biased in direction A by a spring-like member (not shown) disposed in the housing 12. The bolt 16 includes a bolt member 17 and a strike member 19. In use, a portion of a structure makes contact with the strike member 19 causing the strike member 19 to ride against the structure opposite direction A. As the strike member 19 rides in a downward motion against the structure, bolt member 17 is driven in a downward direction causing the spring-like member to be compressed, as shown in FIGS. 2A and 2B. When the strike member 19 reaches a recess of the structure, the bolt 16 will move in direction A (as shown in FIG. 1A) such that the strike member fully engages the recess of the structure locking, for example, a drawer containing the lock in the structure. In other designs, the strike member may interact with components, such as add-on strikes, cup strikes and strike plates, in lieu of engaging a recess.

However, the conventional latchbolt lock 10 has several drawbacks. Initially, if the convex surface 21 of the strike member 19 hits the structure at an improper angle, the bolt 16 may not retract into the housing 12 causing the drawer to bang against the structure without completely closing. Additionally, the repeated hitting of the strike member 19 against the structure may cause an upper portion of the bolt 16 to bend and eventually break causing the lock 10 to be replaced.

Therefore, a need exists for a lock assembly to overcome the above-identified disadvantages.

SUMMARY

Drawer lock assemblies for use with cabinet drawers, desk drawers and the like are provided.

According to one aspect of the present disclosure, a locking device includes a housing, a driver, a latchbolt, and an end plate. The housing includes a front face and a rear face. The front face includes a barrel that extends perpendicular from a front face of the housing. The barrel includes an aperture configured to receive a locking actuation member such as a core, e.g., a key removable core (KRC), small format interchangeable core (SFIC), etc. When an appropriate key inserted into a keyhole of the locking actuation member, rotation of the key will actuate the driver that subsequently actuates the latchbolt into an unlocked position. The latchbolt includes a bolt member and a latching wedge, wherein the latching wedge is coupled to the bolt member in a rotatable relationship. The latchbolt design of the present disclosure allows for the bolt to self-close in the vertical direction down against spring pressure while also having a second rotational axis for the latching wedge to rotate against spring pressure when making contact with a striking point.

It is to be appreciated that the locking device may be mounted on an inner surface of a drawer, where the drawer may include an aperture to receive the barrel including the locking actuation member, so the keyhole of the locking actuation member is exposed on an outer surface of the drawer.

In another aspect, the locking actuation member is at least one of a small format interchangeable core, a key removable core, a large format interchangeable core, a full-size interchangeable core and/or a fixed cylinder.

In one aspect, the barrel is at least one of a cylindrical barrel, an oval barrel, a faceted barrel and/or a rectangular barrel.

In one aspect, the housing is at least one of a rectangular housing and a faceted housing.

According to one aspect of the present disclosure, a drawer lock assembly includes a housing having a front face and a rear face separated by a predetermined width; a barrel having a first end extending perpendicularly from the front face of the housing and a second end extending through the rear face of the housing; a locking actuation member disposed through the first end of the barrel; a driver disposed through the second end of the barrel to engage the locking actuation member; a bolt including a bolt member coupled to a latching wedge in a generally perpendicular relationship, the latching wedge being rotatable relative to the bolt member; an endplate configured to retain the driver and bolt in the housing, the endplate including a recess configured to receive the bolt member; and at least one first spring configured to bias the bolt away from the housing into a locked position, wherein upon actuation of the locking actuation member by a key, the driver interacts with the bolt member to retract a portion of the bolt into the housing in an unlocked position.

In one aspect, the rear face of the housing further includes a recess configured to receive a portion of the bolt.

In another aspect, the recess further includes two semi-circular depressions configured to receive and house the driver.

In a further aspect, the driver includes a first surface and a second surface, the first surface including a slot that is configured to receive a member of locking actuation member, the second surface including cam configured to interact with the bolt to move the bolt into a locked or unlocked position.

In one aspect, the bolt member includes a first portion having a first end and a second end and a second portion fixed in a generally perpendicular relationship to the second end of the first portion, the first portion includes an aperture configured to receive the cam of the driver.

In a further aspect, the second portion of the bolt member includes a first arm including a first arm aperture and a second arm including a second arm aperture, the first and second arm apertures are configured to receive pin to rotatably couple the latching wedge to the bolt member.

In yet another aspect, the second portion further includes a ledge coupled to ends of the first and second arms, the ledge configured to limit the motion of the latching wedge.

In one aspect, the drawer lock assembly further includes at least one second spring disposed about the pin to bias the latching wedge to be in contact with the ledge of the bolt member.

In another aspect, the first portion of the bolt member further includes notch on a side portion adjacent the aperture, the notch configured as a controlled range guide for an allowed motion of the bolt member.

In still another aspect, the drawer lock assembly further includes a detent that extends into the recess of the endplate, the detent configured to be disposed in notch of the bolt member to limit the motion of the bolt.

In another aspect, the endplate includes at least one slot configured to receive the at least one first spring.

According to another aspect of the present disclosure, a multi-axis latchbolt lock assembly includes a housing having a front face and a rear face separated by a predetermined width, the housing configured to be coupled to a movable portion of a structure; a bolt including a bolt member coupled to a latching wedge in a generally perpendicular relationship, the latching wedge being rotatable relative to the bolt member and the bolt member slidingly disposed in the housing; at least one first spring disposed in the housing and configured to bias the bolt away from the housing into a first position; and a locking actuation member disposed in the housing and coupled to the bolt; wherein upon the latching wedge making contact with another portion of the structure, the latching wedge rotates to conform to a surface of the another portion of the structure and the bolt member is biased against the at least one first spring such that the bolt is moved into a second position, upon the latching wedge clearing the another portion of the structure, the bolt moves back into the first position, and wherein upon actuation of the locking actuation member by a key, the locking actuation member interacts with the bolt member to retract a portion of the bolt into the housing into the second position.

BRIEF DESCRIPTION OF THE DRAWINGS

The above and other aspects, features, and advantages of the present disclosure will become more apparent in light of the following detailed description when taken in conjunction with the accompanying drawings in which:

FIGS. 14A-1 through 14C-2 illustrates various views of a multi-axis latchbolt lock assembly in various in accordance with an embodiment of the present disclosure;

It should be understood that the drawings are for purposes of illustrating the concepts of the disclosure and are not necessarily the only possible configuration for illustrating the disclosure.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

Figure 1A:
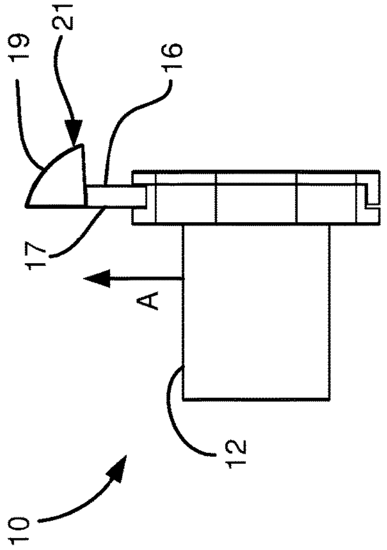
FIG. 1A illustrates a side view of a conventional lock in a locked position and FIG. 1B illustrates a front view of the lock shown in FIG. 1A.
Figure 1B:
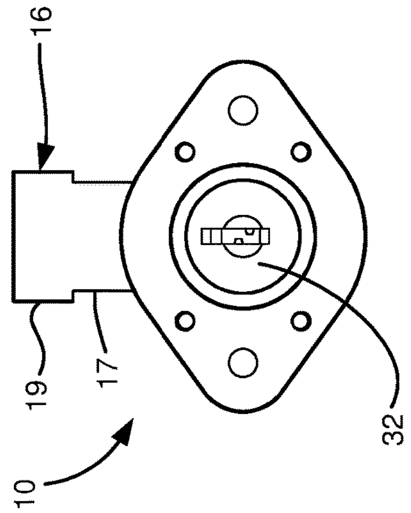
Figure 2A:
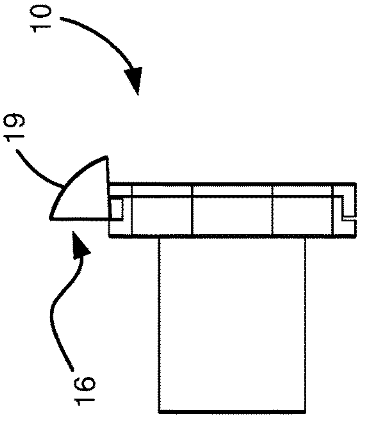
FIG. 2A illustrates a side view of a conventional lock in a depressed position and FIG. 2B illustrates a front view of the lock shown in FIG. 2A.
Figure 2B:
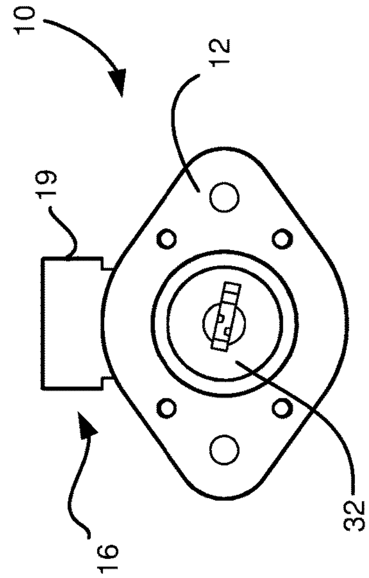
Figure 3:
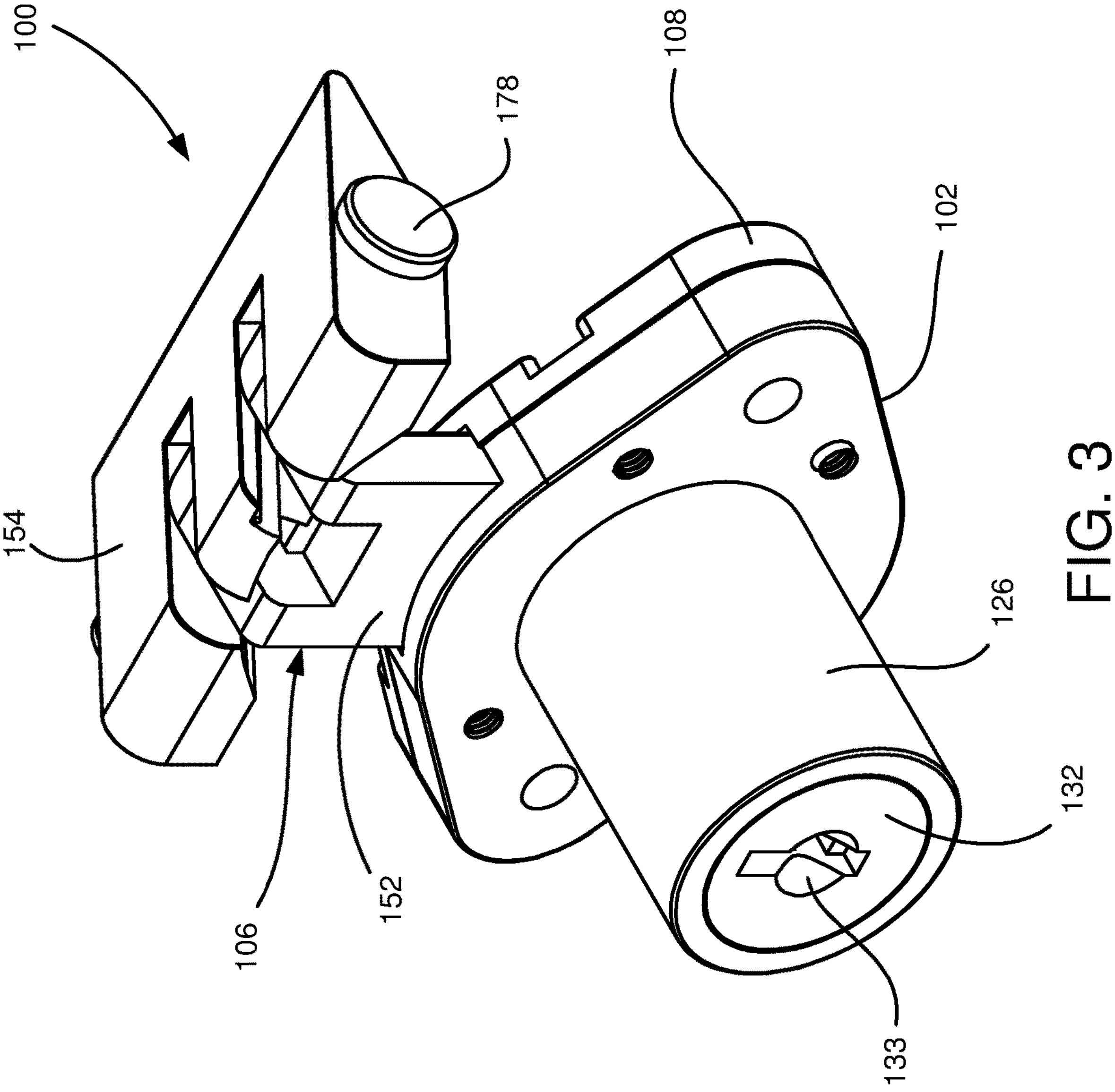
FIG. 3 is a front, perspective view of a multi-axis latchbolt lock assembly in accordance with an embodiment of the present disclosure.
Figure 4:
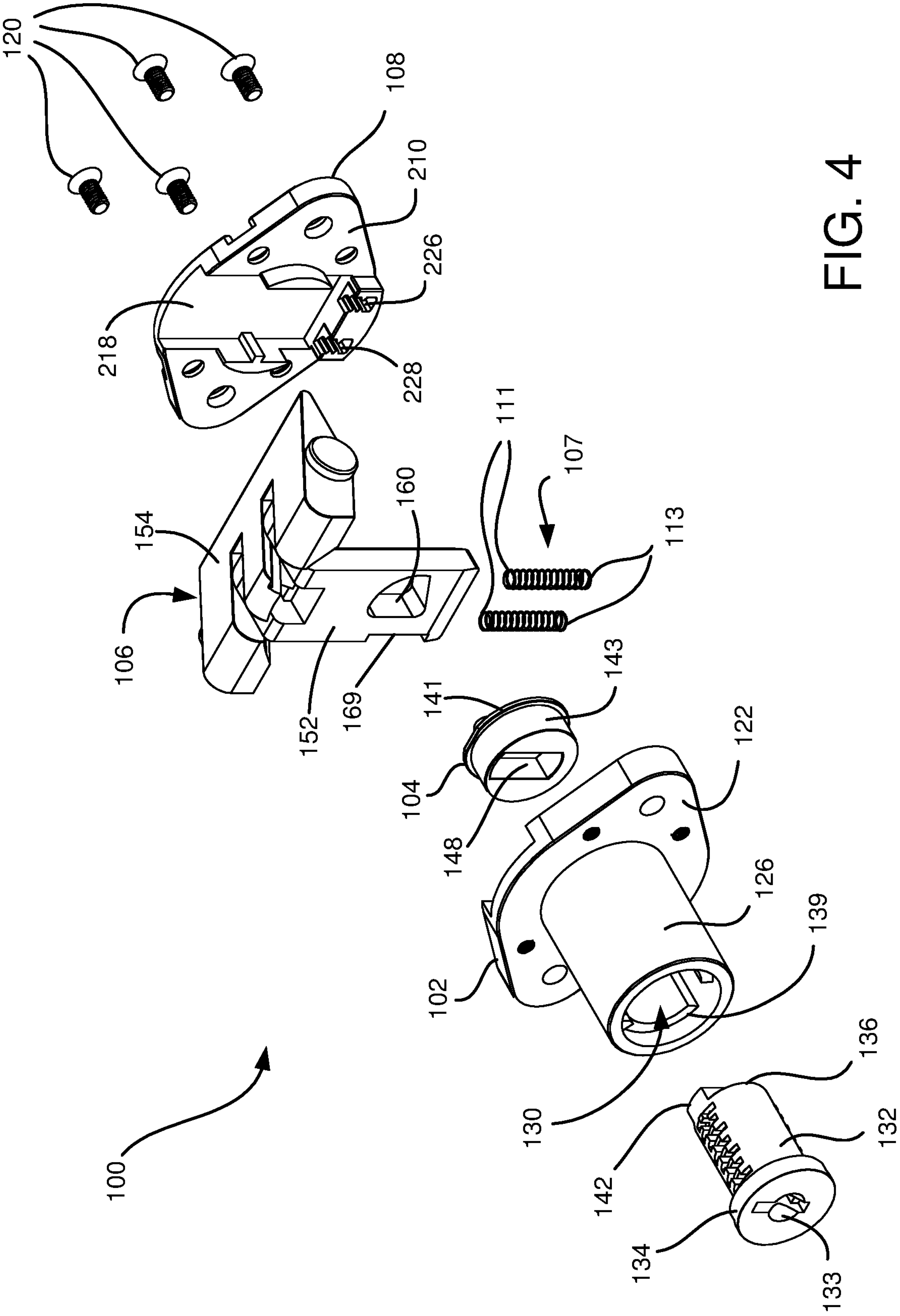
FIG. 4 is a front, perspective exploded view of a multi-axis latchbolt lock assembly in accordance with an embodiment of the present disclosure.

Referring to FIG. 3, a front, perspective view of a multi-axis latchbolt lock assembly 100 in accordance with an embodiment of the present disclosure is illustrated. FIG. 4 is a front, perspective exploded view of the multi-axis latchbolt lock assembly 100, FIG. 5 is a rear, perspective exploded view of the multi-axis latchbolt lock assembly 100 and FIG. 6 is another rear, perspective exploded view of the multi-axis latchbolt lock assembly 100 in accordance with an embodiment of the present disclosure.

The locking device 100 includes a housing 102, a driver 104, bolt 106, an end plate 108 and screws 120.

Figure 7A:
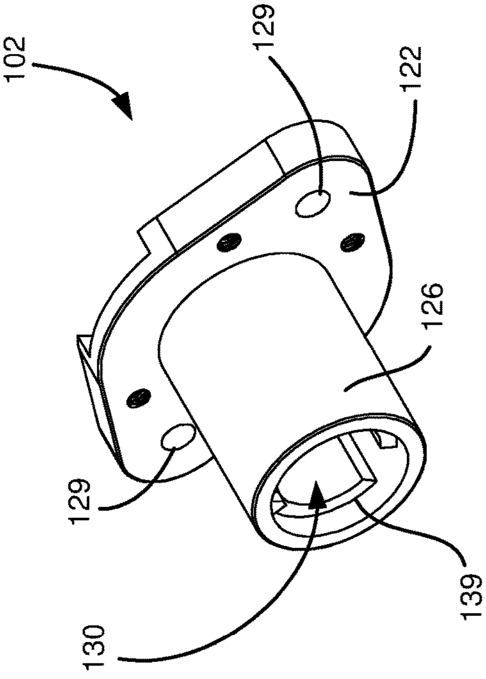
FIGS. 7A-7E illustrate various views of a housing in accordance with an embodiment of the present disclosure.
Figure 7B:
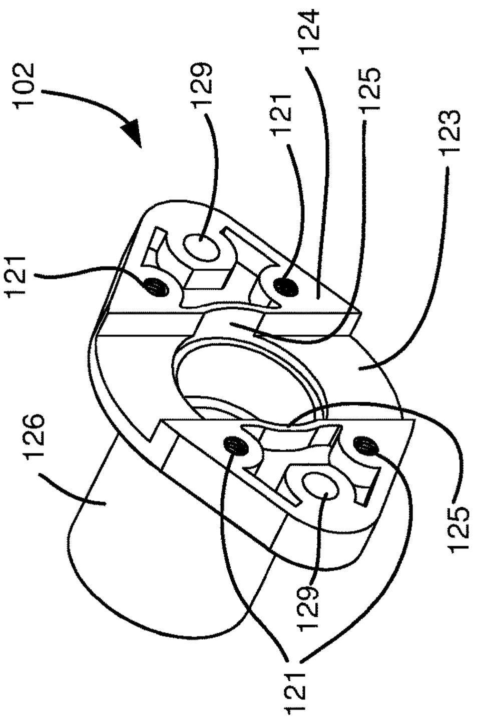
Figure 7C:
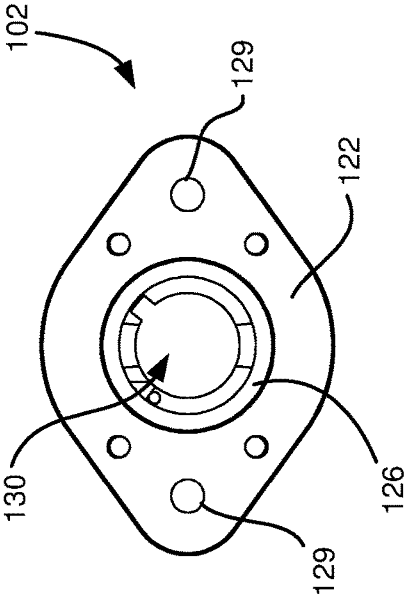
Figure 7D:
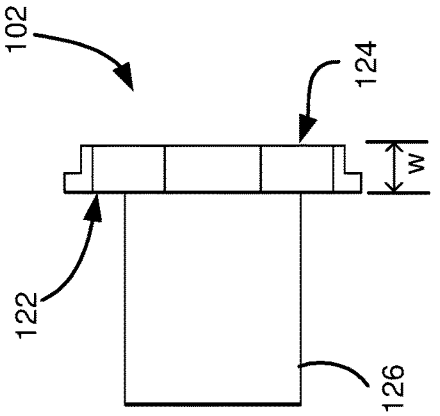
Figure 7E:
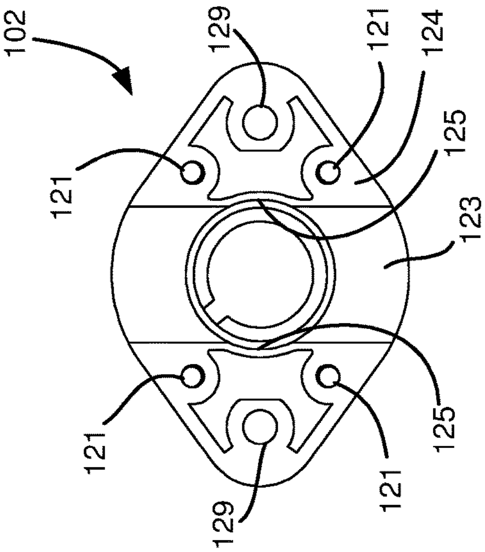

FIGS. 7A-7E illustrate housing 102, where FIG. 7A is a front perspective view, FIG. 7B is a rear perspective view, FIG. 7C is a front view, FIG. 7D is a side view and FIG. 7E is a rear view. In this embodiment, housing 102 is generally rectangular and includes a front face 122 and a rear face 124 face separated by a predetermined width w, as shown in FIG. 7D. The front face 122 includes a cylindrical member or barrel 126 that extends perpendicular from the front face 122 of the housing 102. The cylindrical member or barrel 126 includes an aperture 130 configured to receive a locking actuation member such as a core 132. The rear face 124 includes a plurality of threaded apertures 121 for receiving screws 120, as will be described in more detail below. The rear face 124 further includes a recess 123 configured to receive a portion of the bolt 106. Recess 123 further includes two semi-circular depressions 125 configured to receive and house the driver 104. The housing 102 further includes apertures 129 extending from the rear surface 124 through to the front surface 122 that enable the housing to be coupled to a surface of a structure, the details of which will be described below.

Figure 5:
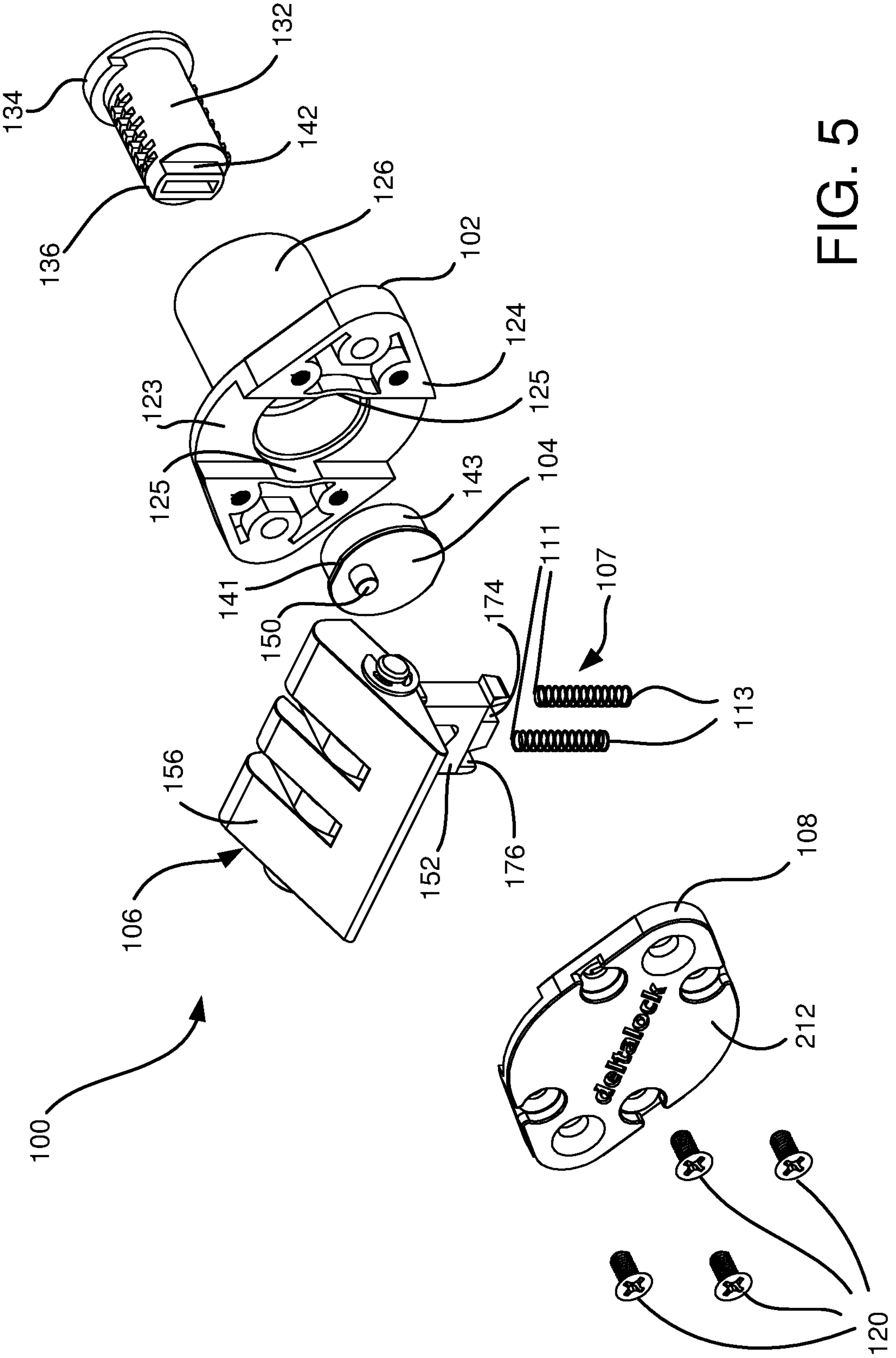
FIG. 5 is a rear, perspective exploded view of a multi-axis latchbolt lock assembly in accordance with an embodiment of the present disclosure.
Figure 6:
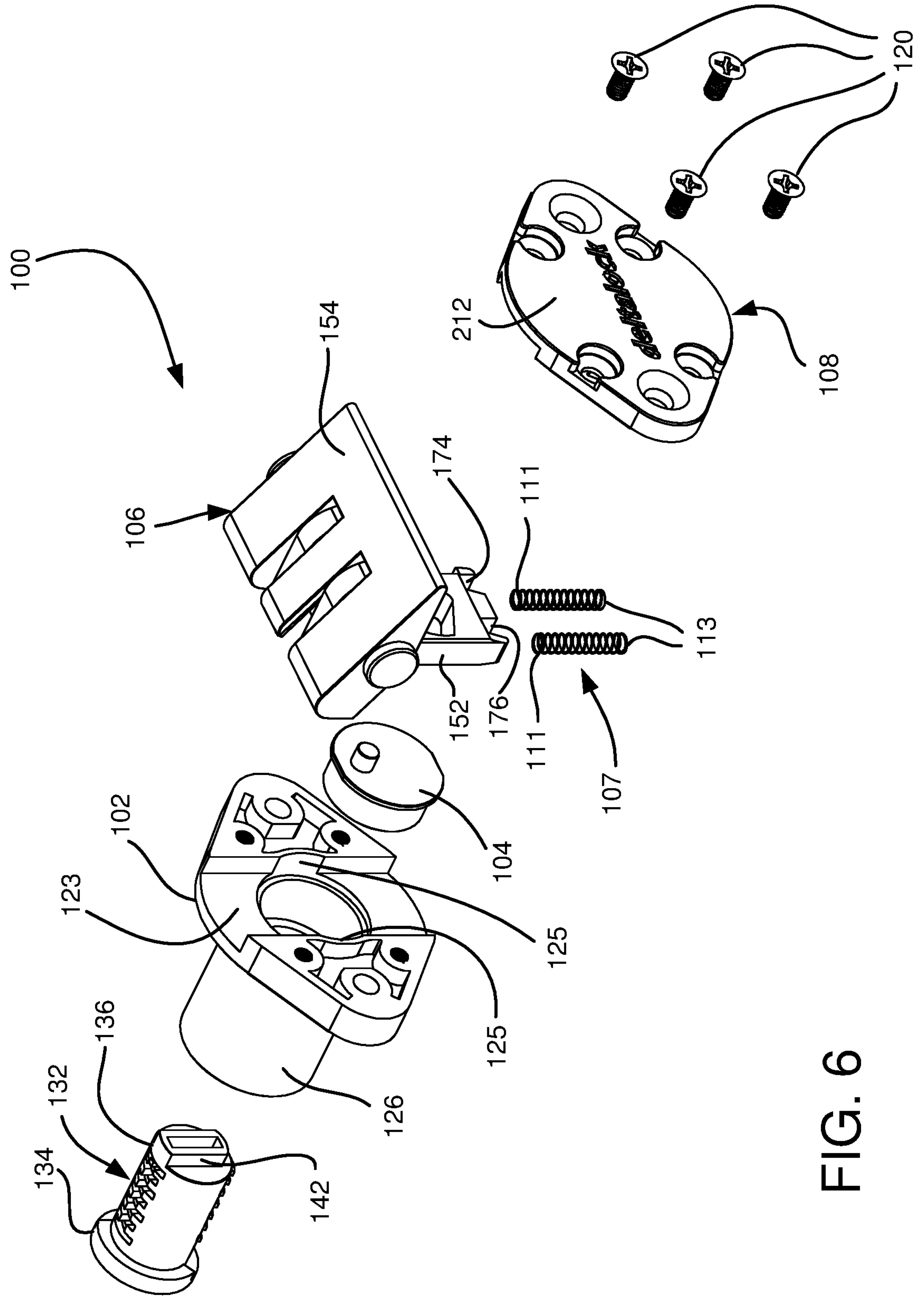
FIG. 6 is another rear, perspective exploded view of a multi-axis latchbolt lock assembly in accordance with an embodiment of the present disclosure.

As shown in FIGS. 4-6, core 132, e.g., a key removable core (KRC), is generally cylindrical and includes a first end 134 and a second 136. When the core 132 is disposed in the aperture 130 of barrel 126, the first end 134 will come into contact with an edge 139 formed in the aperture 130 to prevent further movement of the core 132 into the aperture 130. Core 132 further includes at least a first projection and a second projection (not shown) which retain the core 132 in the housing 102, It is to be appreciated that an appropriate key (e.g., a control key) inserted into a keyhole 133 of core 132 will actuate the first and second projections to enable the core 132 to be retained or removed from the barrel 126. The second end 136 of core 132 includes a rectangular member 142 that is configured to interact with driver 104, as will be described below.

Figure 8E:
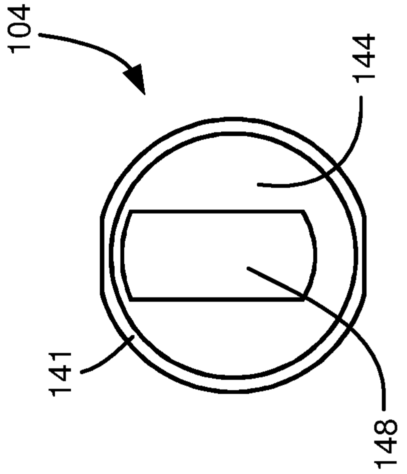
FIGS. 8A-8E illustrate various views of a driver in accordance with an embodiment of the present disclosure.
Figure 8B:
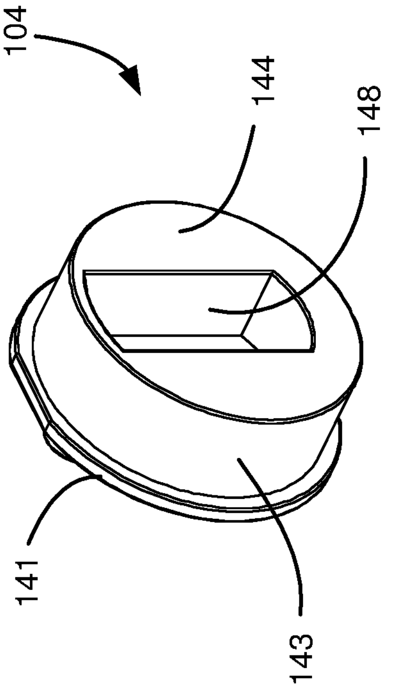
Figure 8D:
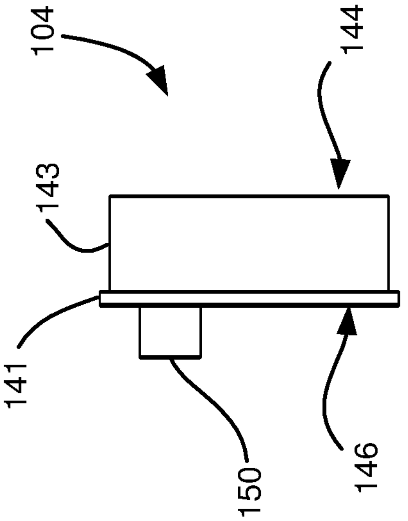
Figure 8A:
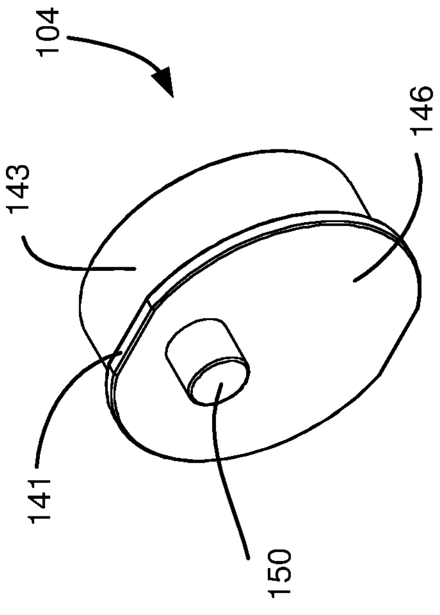
Figure 8C:
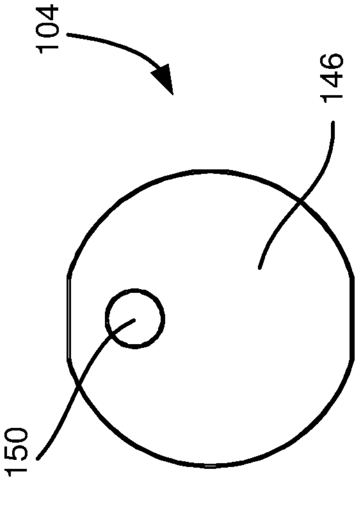

FIGS. 8A-8E illustrate driver 104, where FIG. 8A is a front perspective view, FIG. 8B is a rear perspective view, FIG. 8C is a front view, FIG. 8D is a side view and FIG. 8E is a rear view. The generally circular driver 104 includes a first surface 144 and a second surface 146. The first surface 144 includes slot 148 that is configured to receive member 142 of core 132. Second surface 146 includes cam 150 which is disposed off-center on second surface 146. Cam 150 is configured to interact with bolt 106 to move bolt 106 into an unlocked position, i.e., withdraw a portion of the bolt 106 into the housing 102. Circular first surface 146 is slightly larger than second surface 144 forming lip 141 relative to cylindrical portion 143.

Figure 9B:
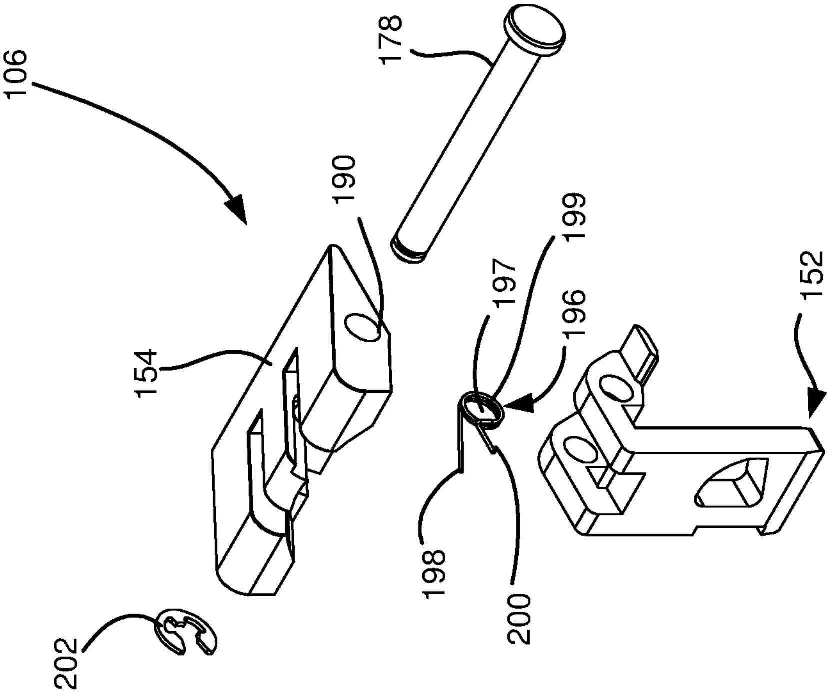
FIGS. 9A and 9B illustrate exploded views of a latch bolt in accordance with an embodiment of the present disclosure.
Figure 9A:
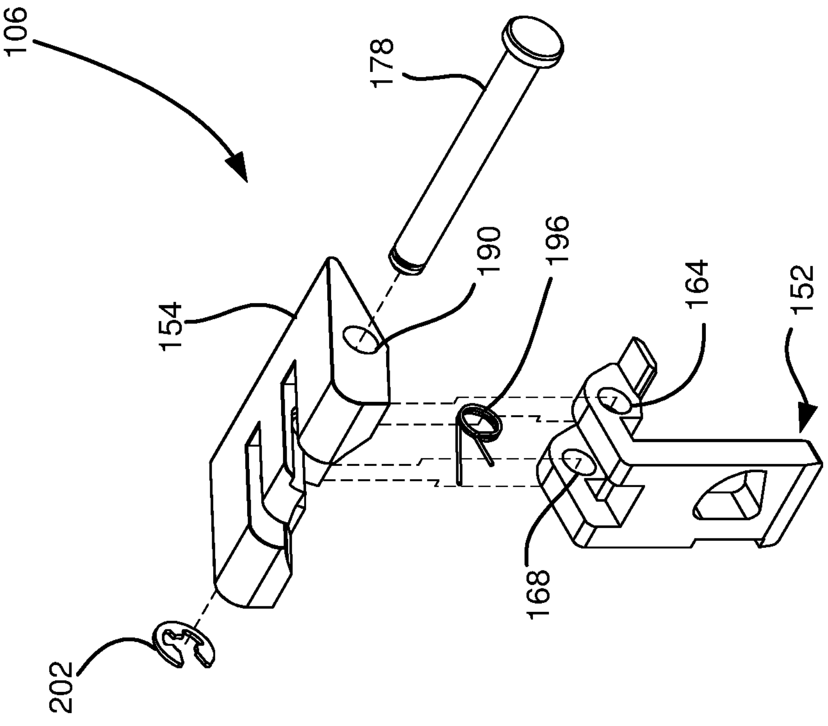
Figures 10A, 10B, 10C, 10D, 10E, 10F, 10G:
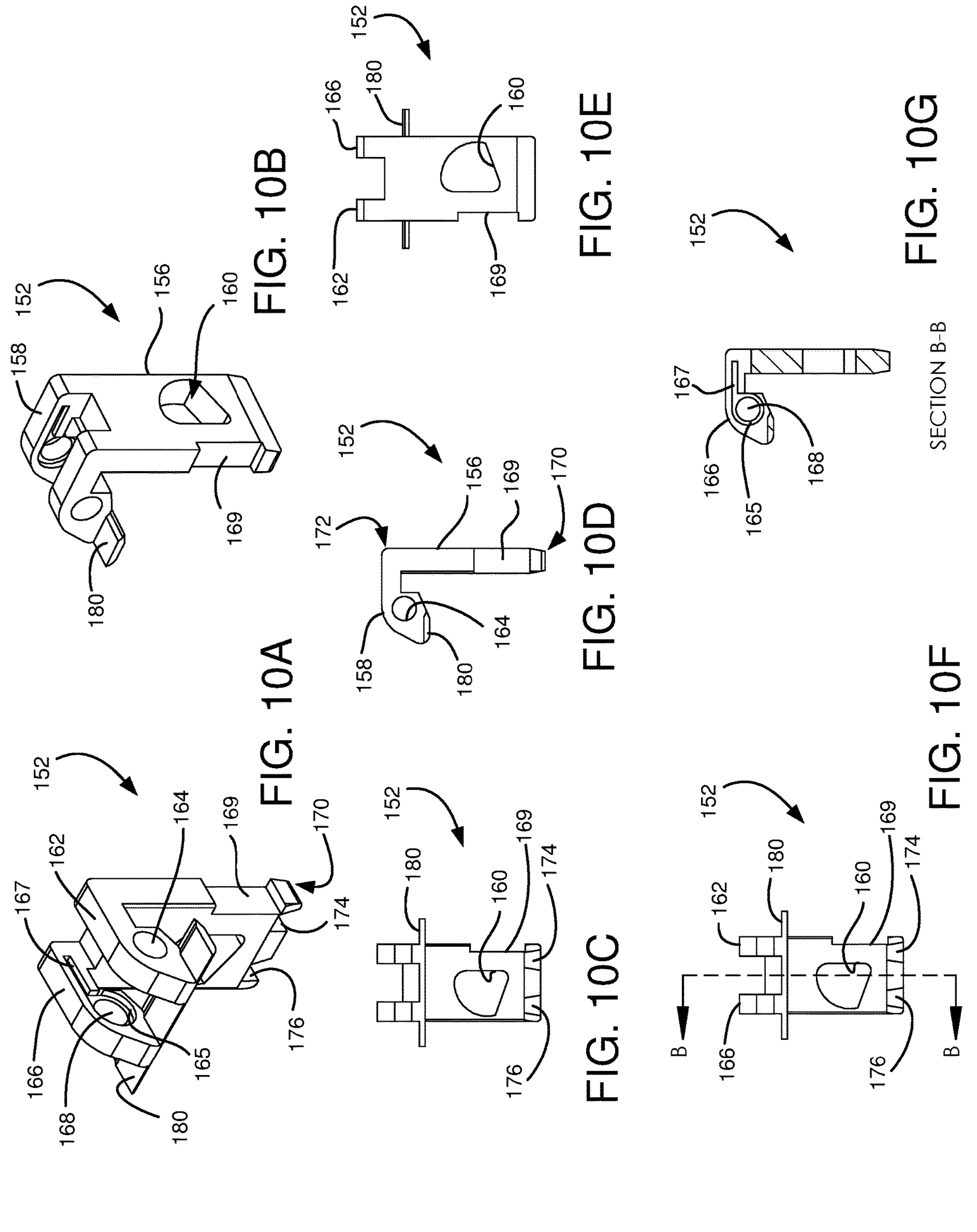
FIGS. 10A-10G illustrate various views of a bolt member in accordance with an embodiment of the present disclosure.

Referring to FIGS. 9A and 9B, bolt 106 is illustrated, where bolt 106 includes a bolt member 152 coupled to a latching wedge 154 in a generally perpendicular relationship. FIGS. 10A-10G illustrate bolt member 152, where FIG. 10A is a front perspective view, FIG. 10B is a rear perspective view, FIG. 10C is a front view, FIG. 10D is a side view, FIG. 10E is a rear view, FIG. 10F is another front view and FIG. 10G is a cross section taken along line B-B of FIG. 10F. Bolt member 152 includes a first portion 156 having a first end 170 and a second end 172 with a second portion 158 fixed in a generally perpendicular relationship to the second end 172 of the first portion 156. First portion 156 includes an aperture 160 configured to receive cam 150 of driver 104, where cam 150 actuates the bolt 106 as will be described in detail below. In one embodiment, the aperture 160 is generally cone-shaped. The first end 170 of the first portion 156 includes first and second notches 174, 176 each configured to receive a spring 107. Although the spring 107 is shown as a coil spring, other spring or elastic members may be employed. The first portion 156 further includes a third notch 169 on a side portion adjacent the aperture 160. The third notch 169 serves as a stop in the upward motion of the bolt member 152 as well as a controlled range guide for the allowed motion of the bolt member 152.

Second portion 158 includes first arm 162 including a first arm aperture 164 and a second arm 166 including a second arm aperture 168. The first and second arm apertures 164, 168 are configured to receive pin 178 to rotatably couple latching wedge 154 to the bolt member 152. The second portion 158 further includes ledge 180 coupled to ends of the first and second arms 162, 166. The ledge 180 is configured to limit the motion of the latching wedge 154 when latching wedge 154 is coupled to the second portion 158. Although the first portion 156, second portion 158 and ledge 180 are shown as a single unitary component, it is to be appreciated that each of the first portion 156, second portion 158 and ledge 180 may be separate components or a combination of components that are coupled together to achieve the functionality described above.

Figures 11A, 11B, 11C, 11D, 11E, 11F, 11G, 11H:
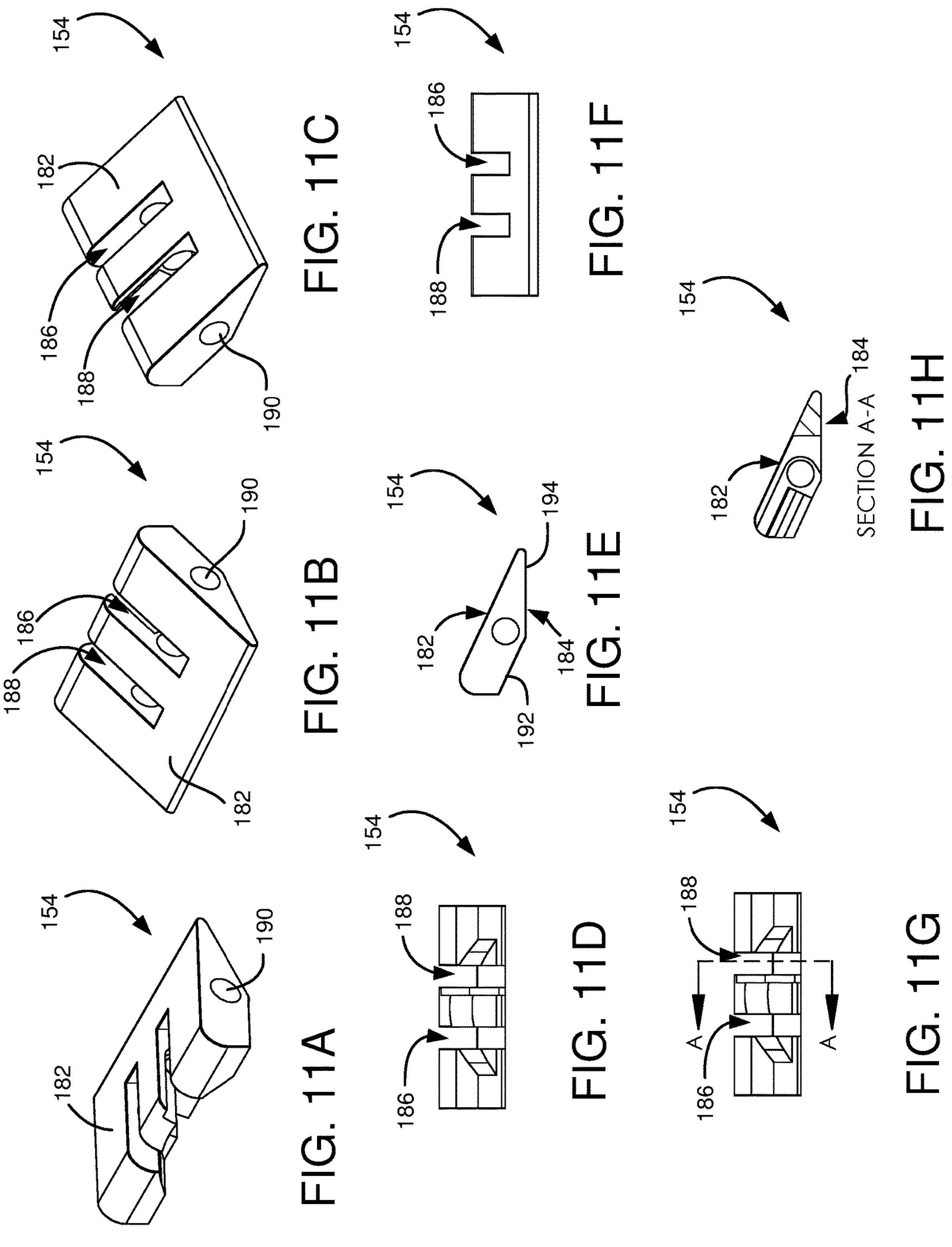
FIGS. 11A-11H illustrate various views of a latching wedge in accordance with an embodiment of the present disclosure.

FIGS. 11A-11H illustrate latching wedge 154, where FIG. 11A is a rear perspective view, FIG. 11B is a front perspective view, FIG. 11C is another front perspective view, FIG. 11D is a rear view, FIG. 11E is a side view, FIG. 11F is a front view, FIG. 11G is another rear view and FIG. 11H is a cross section taken along line A-A of FIG. 11G. Latching wedge 154 included an upper surface 182 and a lower surface 184. Latching wedge 154 further includes first and second slots 186, 188 respectively configured to receive the first and second arms 162, 166 of the second portion 158 of the bolt member 152. An aperture 190 runs through the length of the latching wedge 154 that receives the pin 178 when coupling the latching wedge 154 to the bolt member 152. It is to be appreciated that the upper surface 182 of the latching wedge is generally flat where the lower surface 184 includes a first portion 192 which is generally parallel to the first surface 182 and a second portion 194 that is configured at an angle relative to the first portion 192.

Referring back to FIGS. 9A and 9B, to assemble the bolt 106, latching wedge 154 is disposed over the second portion 158 of the bolt member 152 such that first and second arms 162, 166 enter slots 186, 188. At least one spring 196 is disposed in one of the slots 186, 188 of the latching wedge 154. The spring 196 includes an aperture 197 and a first arm 198 and a second arm 200. As shown in FIG. 10A, second arm 166 of bolt member 152 includes a recess 165 about aperture 168 and a slot 167 in communication with recess 165. It is to be appreciated that circular portion 199 of spring 196 will sit in recess 165 and second arm 200 of spring 196 will sit in slot 197 to retain the spring 196 in the second arm 166. When first and second arm apertures 164, 168, aperture 190 of latching wedge 154 and aperture 197 of spring 196 are aligned, pin 178 is disposed therethrough and secured in place by retaining member 202. In this manner, latching wedge 154 is in a rotatable relationship to the bolt member 152 via the axis created by the pin 178. In a normal state, spring 196 will bias the latching wedge 154 (i.e., first arm 198 will come into contact with first portion 192 of the lower surface 184 of latching wedge 154) such that second portion 194 of the lower surface 184 of the latching wedge 154 will be in contact with the ledge 180 of the bolt member 152.

Figure 12B:
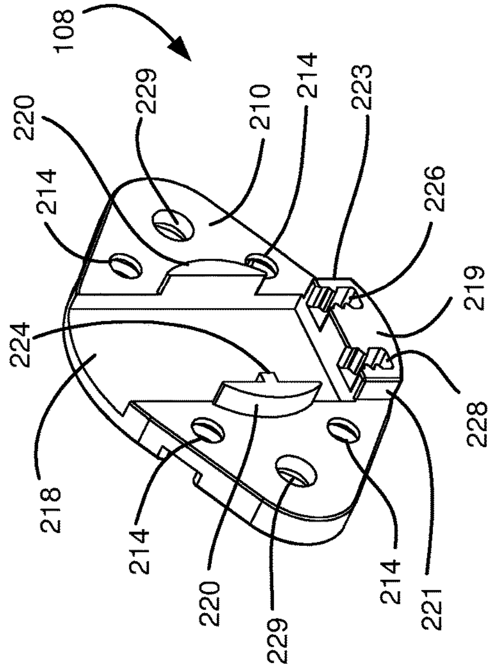
FIGS. 12A-12E illustrate various views of an endplate in accordance with an embodiment of the present disclosure.
Figure 12E:
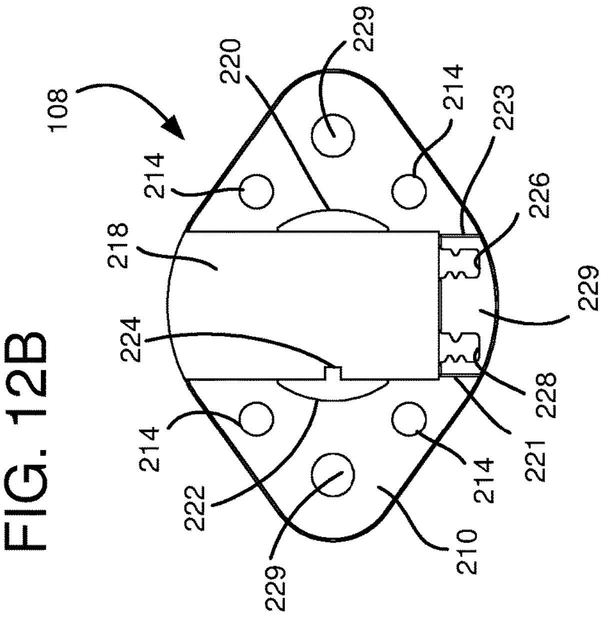
Figure 12A:
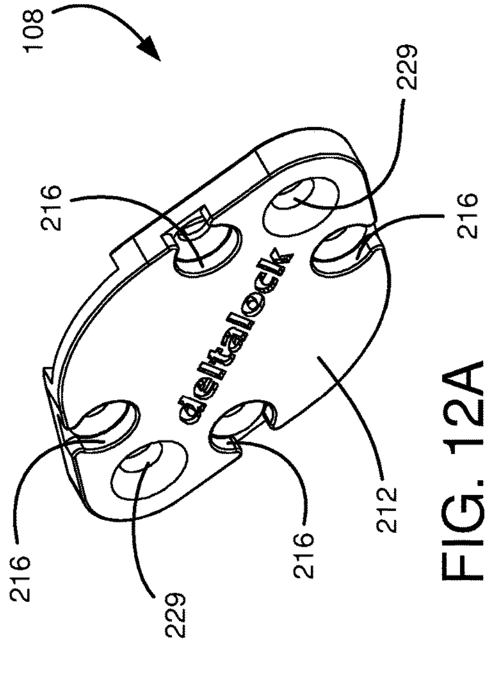
Figure 12D:
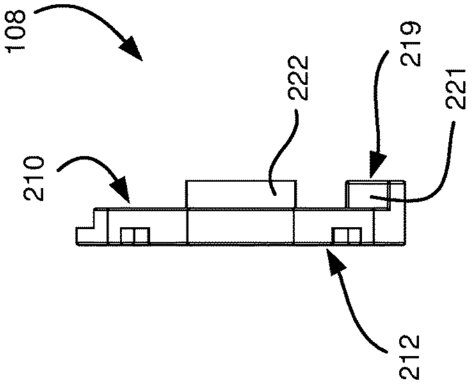
Figure 12C:
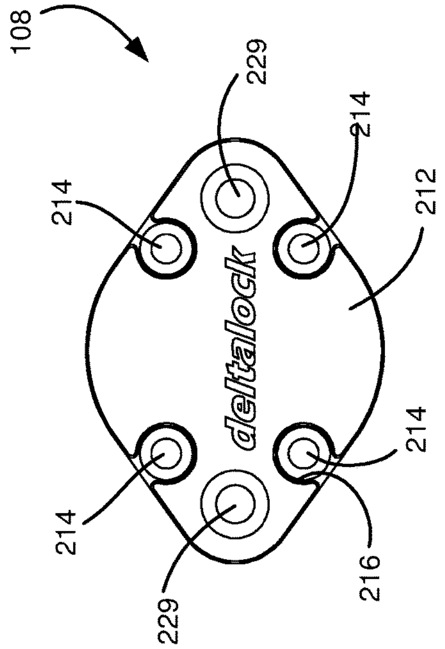

Referring to FIGS. 12A-12E, endplate 108 is illustrated, where FIG. 12A is a rear perspective view, FIG. 12B is a front perspective view, FIG. 12C is a rear view, FIG. 12D is a side view and FIG. 12E is a front view. The endplate 108 includes a front surface 210 and a rear surface 212, where the rear surface 212 is the rear surface of the lock assembly 100. The endplate 108 includes a plurality of apertures 214 extending from the rear surface 212 through to the front surface 210 where the apertures 214 are configured to receive screws 120, or other fastening means to secure the endplate 108 to the housing 102 via apertures 121. It is to be appreciated that the apertures 214 may include a recessed (or stepped) portion 216 on the rear surface 212 such that when the screws 120 are disposed in the apertures 214 of the endplate 108 the heads of the screws 102 are disposed in the recessed portion 216 so the rear surface 212 of the endplate 108 is flat with no protrusions extending therefrom. The endplate 108 further includes a plurality of apertures 229 extending from the rear surface 212 through to the front surface 210 where the apertures 229 are configured to receive screws (not shown), or other fastening means, to secure the lock assembly 100 to a structure.

The front surface 210 includes a generally rectangular recess 218 for receiving the first portion 156 of the bolt member 152. On both sides of the recess 218 are first and second semi-circular members 220, 222 which are configured to mate with the depressions 125 of housing 102. Member 222 further includes a detent 224 which extends into recess 218. The detent 224 is configured to be disposed in notch 169 of the bolt member 152 to limit the motion of the bolt 106 when in use. A lower portion 219 of recess 218 includes two slots 226, 228 configured to receive a lower end 113 of springs 107. Portion 219 extends from recess 218 with side walls 221 and 223. When assembled, portion 219 enters recess 123 of housing 102 such that the endplate 108 does not rotate relative to the housing 102.

Referring back to FIGS. 4-6, the assembling of the lock assembly 100 will be described. Core 132 is disposed in the barrel 126 of housing 102. A control key is inserted into keyhole 133 which actuates projections from the core 132 to retain the core 132 in the housing 102. Driver 104 is disposed in the aperture 130 of housing 102 such that depressions 125 receive the driver 104 and slot 148 of driver 104 receives the projection 142 of the core 132. Lower end 113 of each spring 107 is disposed in slots 226, 228 of endplate 108. The first portion 156 of bolt member 152 is then disposed in recess 218 of endplate 108 such that upper ends 111 of springs 107 are disposed in slots 174, 176. The endplate 108 is then brought into contact with the rear face 124 of housing 102 such that first portion 156 of bolt 106 is disposed in recess 123 of housing 102, cam 150 is disposed in aperture 160 of bolt 106 and members 220, 222 are disposed with depressions 125. The endplate 108 is then secured to the housing 102 via screws 120, or any fastening means. When the endplate 108 is secured to the housing 102, apertures 129 of housing 102 align with apertures 229 of endplate 108 enabling a screw or other fastener to pass through to secure the lock assembly 100 to a structure.

In one embodiment, the lock assembly 100 may be mounted or coupled to a drawer of a structure. The barrel 126 may be disposed in an aperture of the drawer such that surface 122 of housing 102 make contacts with a surface of the drawer. Screws (or other fasteners) may be disposed through apertures 129 and 229 to secure the lock assembly 100 to the drawer.

Figures 1, 2, 13, 13A, 13B, 13C:
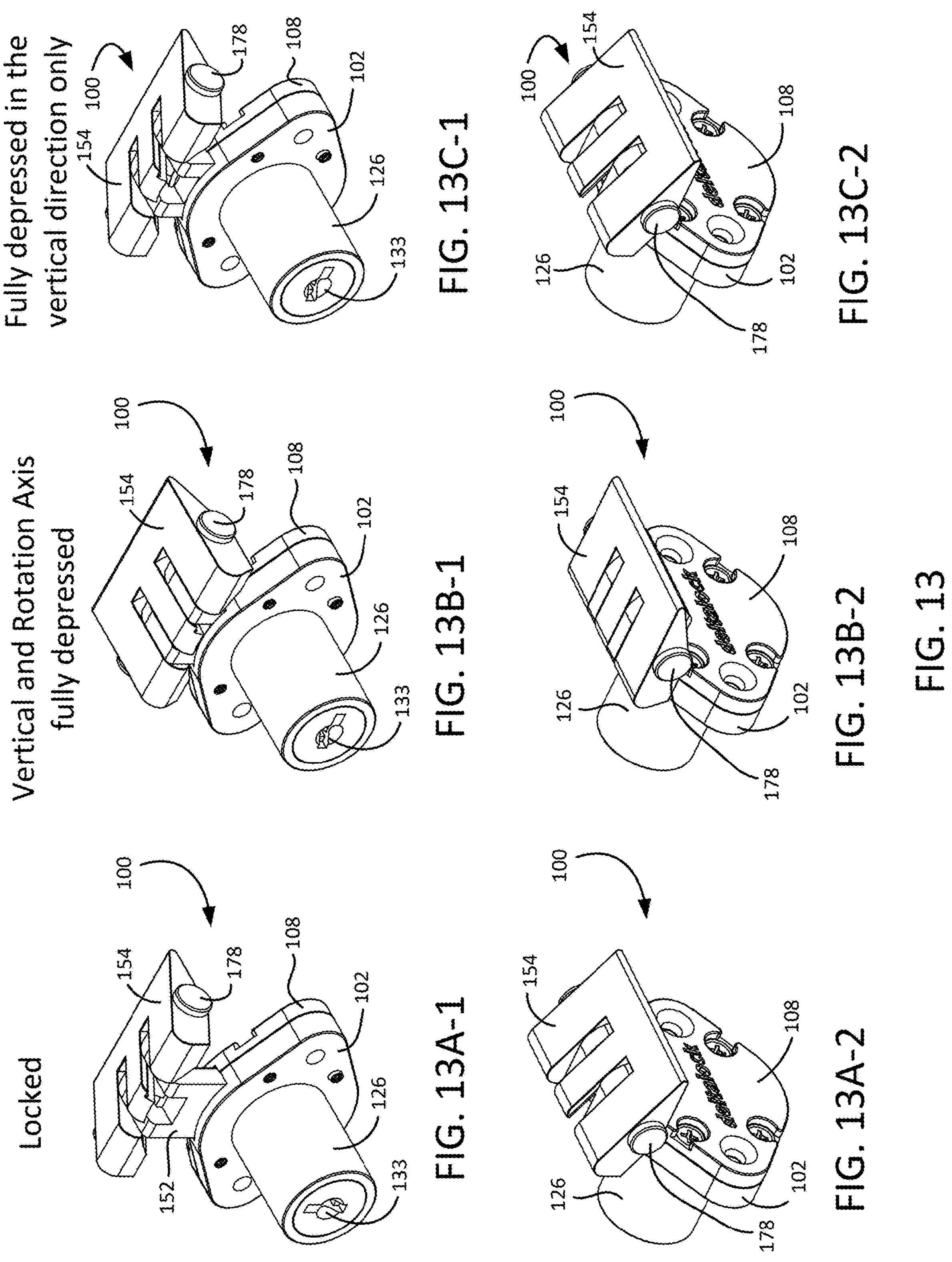
FIGS. 13A-1 through 13C-2 illustrate various perspective views of a multi-axis latchbolt lock assembly in various positions in accordance with an embodiment of the present disclosure.
Figures 1, 2, 14, 14A, 14B, 14C:
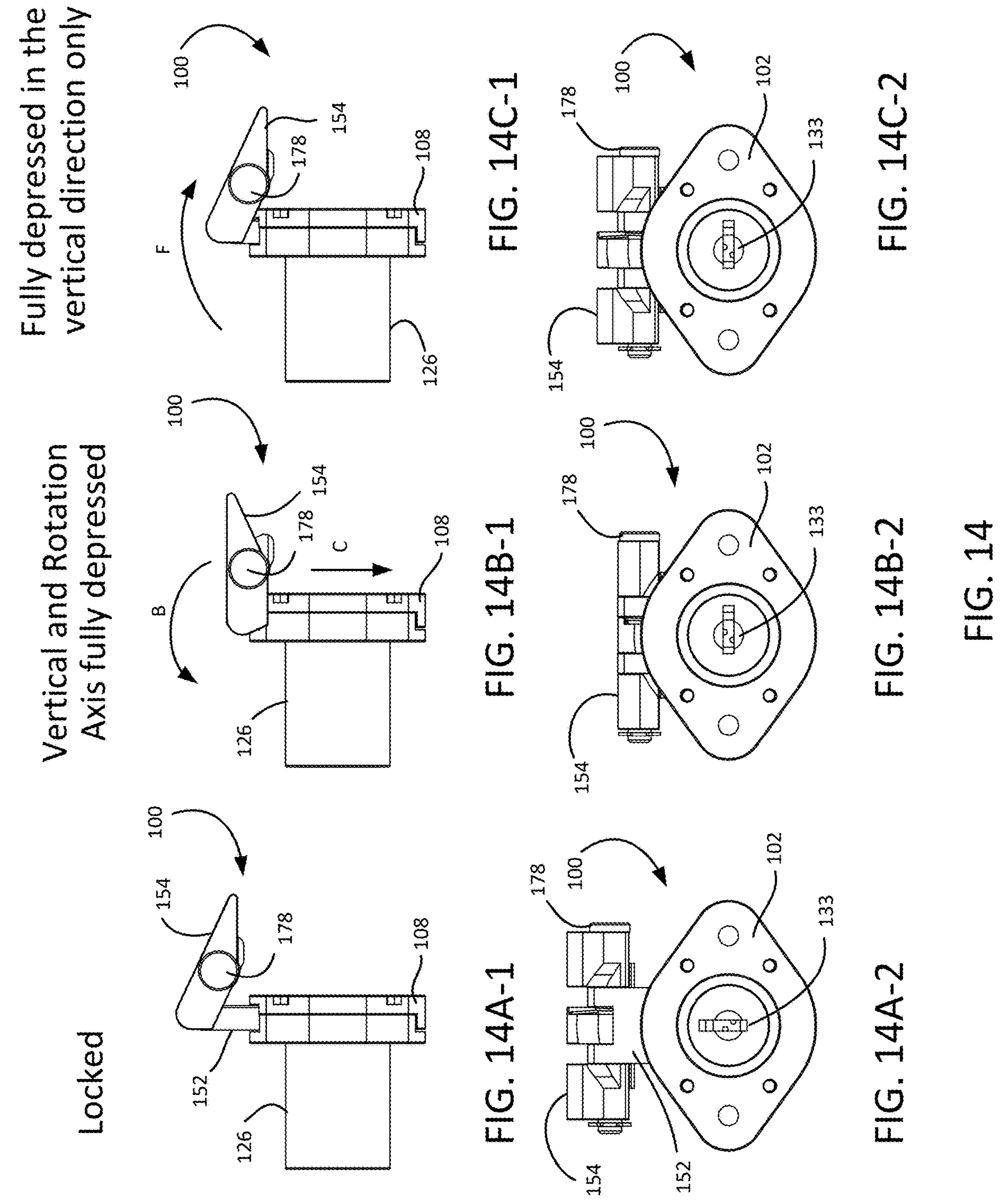

Referring to FIGS. 13 and 14, the operation of the locking assembly 100 will be described. It is to be appreciated that in FIGS. 13 and 14 figures with similar letter references relate to a different view of the same position, for example, FIG. 13A-1 is a front perspective view of the lock 100 in the locked position, FIG. 13A-2 is a rear perspective view of the lock 100 in the locked position, FIG. 14A-1 is a side view of the lock 100 in the locked position, and FIG. 14A-2 is a front view of the lock 100 in the locked position. Additionally, FIG. 13B-1 is a front perspective view of the lock 100 in a vertical and rotation axis full depressed position, FIG. 13B-2 is a rear perspective view of the lock shown in FIG. 13B-1, FIG. 14B-1 is a side view of the lock 100 shown in FIG. 13B-1, and FIG. 14B-2 is a front view of the lock 100 shown in FIG. 13B-1. Lastly, FIG. 13C-1 is a front perspective view of the lock 100 in a full depressed vertical direction only position, FIG. 13C-2 is a rear perspective view of the lock shown in FIG. 13C-1, FIG. 14C-1 is a side view of the lock 100 shown in FIG. 13C-1, and FIG. 14C-2 is a front view of the lock 100 shown in FIG. 13C-1.

In FIGS. 13A-1, 13A-2, 14A-1 and 14A-2, the lock assembly 100 is illustrated in the locked position, or normal state. In the locked position, the bolt 106 is in the fully vertical extended position and the latching wedge 154 is in the normal position where surface 194 is in contact with ledge 180. In the locked position, the drawer that the lock assembly 100 is mounted to may be in the open position, or alternatively, the latching wedge 154 may be disposed in a recess of a structure after the drawer has been slid into the closed position.

In FIGS. 13B-1, 13B-2, 14B-1 and 14B-2, the lock assembly 100 is illustrated where the bolt 106 is vertically depressed and the latching wedge 154 is rotationally depressed. Here, the latching wedge 154 makes contact with a structure causing the latching wedge 154 to rotate in a direction as indicated by arrow B. Additionally, the contact with the structure will cause the bolt member 152 to retract into the housing 102 in a direction indicated by arrow C.

In FIGS. 13C-1, 13C-2, 14C-1 and 14C-2, the lock assembly 100 is illustrated where the bolt 106 is vertically depressed and the latching wedge 154 is a normal state. After the latching wedge 154 clears the portion of the structure and enters a recess of the structure, the latching wedge 154 will return to the normal state by rotating in direction indicated by arrow F.

The locking assembly 100 of the present disclosure allows for the bolt 106 to self-close in the vertical direction depressing down against spring pressure, e.g., springs 107, while also having a second rotational axis for the latching wedge 154 to rotate against spring pressure, e.g., spring 196, when making contact with a striking point. The second axis, i.e., the axis created by pin 178, allows the latching wedge 154 to ease into the striking surface while simultaneously depressing the bolt 106 in the downward direction. The combination of these movements makes for smooth latching as well as the ability to provide a more secure latch once engaged. This added security is a result of the new design allowing the striking surface to engage at a lower point on the latching wedge 154 which equates to an increase in the length of bolt 106 which engages when locked.

Figure 15A:
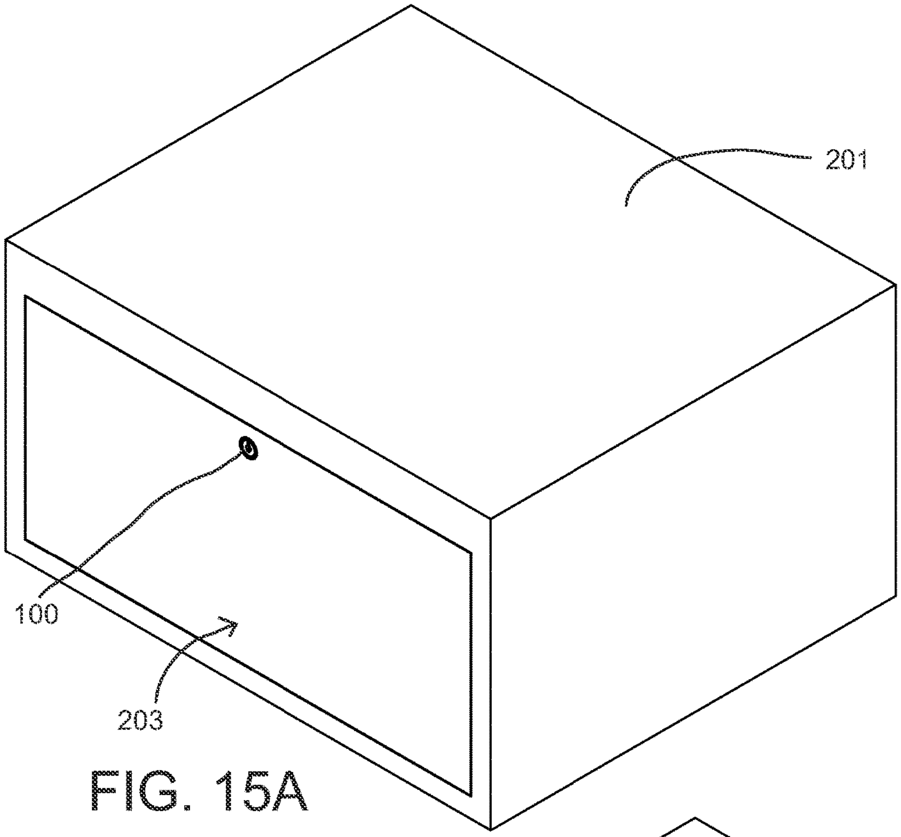
FIG. 15A is a perspective view of a structure including a multi-axis latchbolt lock assembly in accordance with an embodiment of the present disclosure.
Figure 15B:
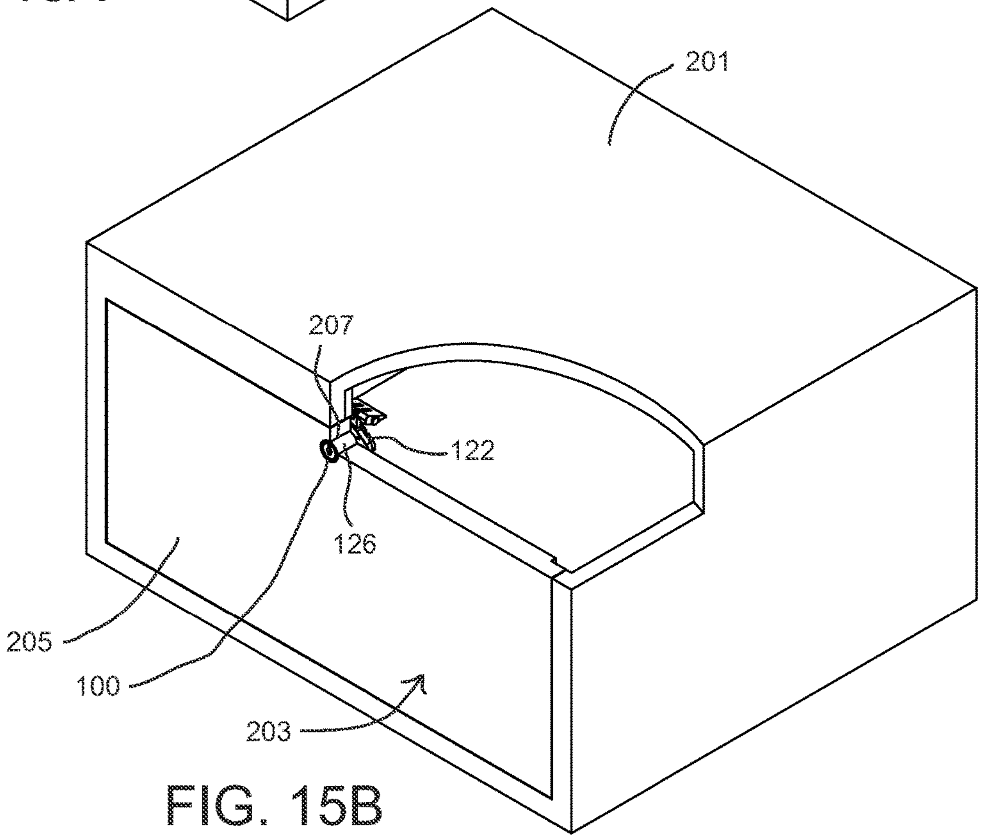
FIG. 15B is a perspective view of the structure shown in FIG. 15A with a portion cut-away in accordance with an embodiment of the present disclosure.

Referring to FIGS. 15A-15I, the operation of the locking assembly 100 will be described in relation the operation of a drawer of a structure, e.g., a file cabinet, desk, etc. FIG. 15A illustrates a structure 201 having a drawer 203 (e.g., a movable portion of the structure) with a lock assembly 100 of the present disclosure mounted or coupled to the drawer and FIG. 15B illustrates the structure 201 having a cutaway view. Referring to FIG. 15A, the end 134 of core 132 extends through the drawer 203 when the drawer 203 is a closed position and therefore, keyhole 133 is accessible to operate the lock assembly 100. As shown in FIG. 15B, barrel 126 is disposed through aperture 207 of front face 205 of drawer 203. The front face 122 of housing 102 is in contact with a rear surface 209 of drawer 203. Screws (or other fasteners) may be disposed through apertures 129 and 229 to secure the lock assembly 100 to the rear surface 209 of the drawer 203, i.e., at least one end of the screws will engage the rear surface 209 of the drawer 203.

Figure 15C:
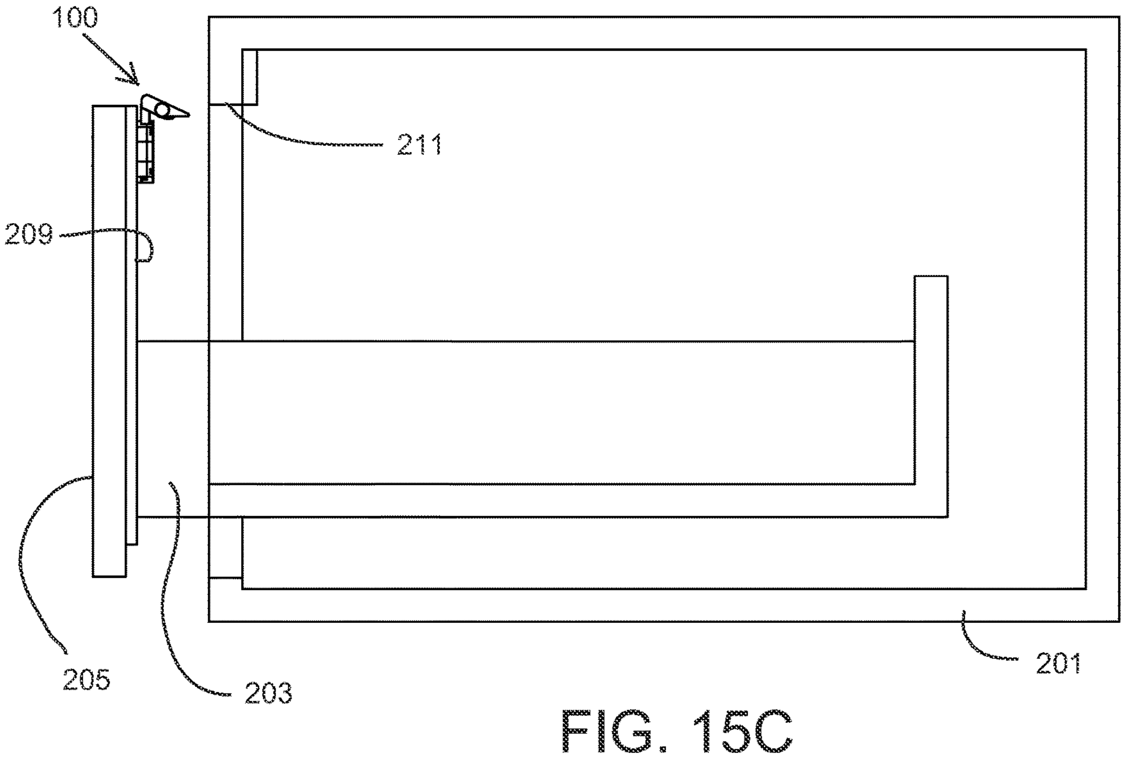
FIG. 15C is a cross-sectional view of a structure including a multi-axis latchbolt lock assembly with a drawer slightly ajar in accordance with an embodiment of the present disclosure.

FIG. 15C illustrates the lock assembly 100 in a normal state (i.e., a first position) when the drawer 203 is open relative to the structure 201. As shown in FIG. 15C, the bolt 106 is in the fully vertical extended position, i.e., biased by springs 107, and the latching wedge 154 is in the normal position where surface 194 is in contact with ledge 180. It is to be appreciated that the normal state of lock assembly 100 is shown and described above in relation to FIGS. 13A-1, 13A-2, 14A-1 and 14A-2.

Figure 15D:
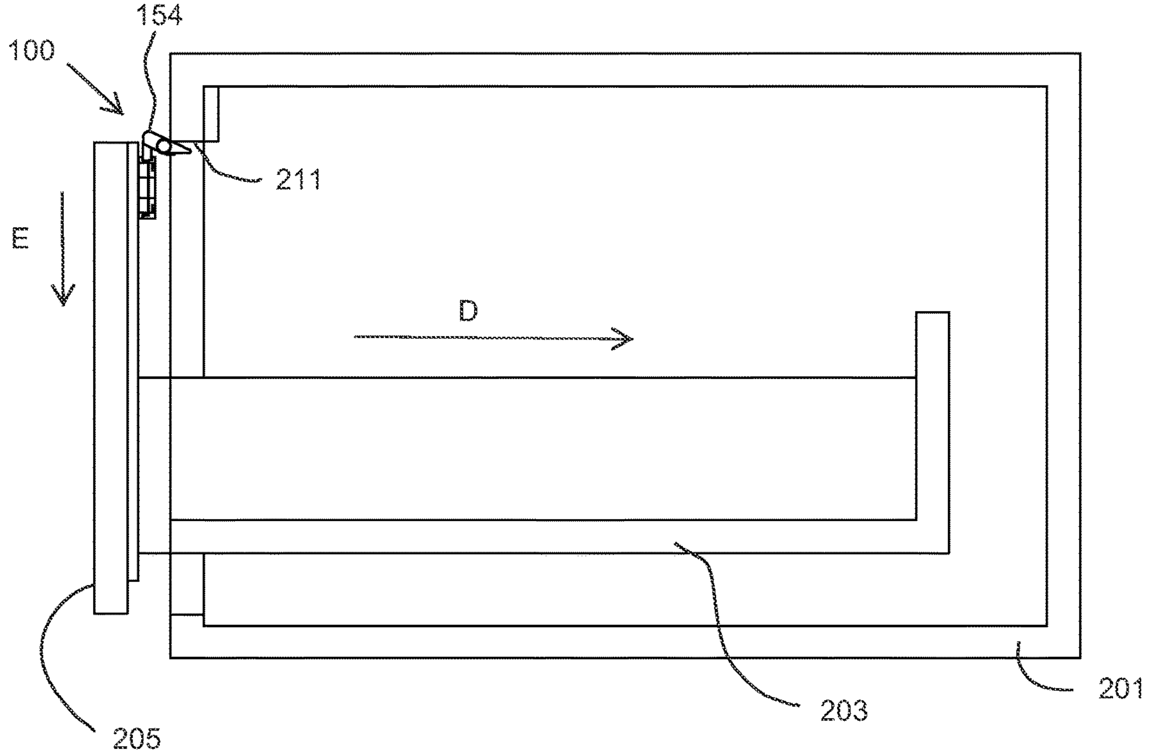
FIG. 15D-15G illustrate cross-sectional views of a structure including a multi-axis latchbolt lock assembly where the structure makes contact with a bolt of the multi-axis latchbolt lock assembly in accordance with an embodiment of the present disclosure.
Figure 15E:
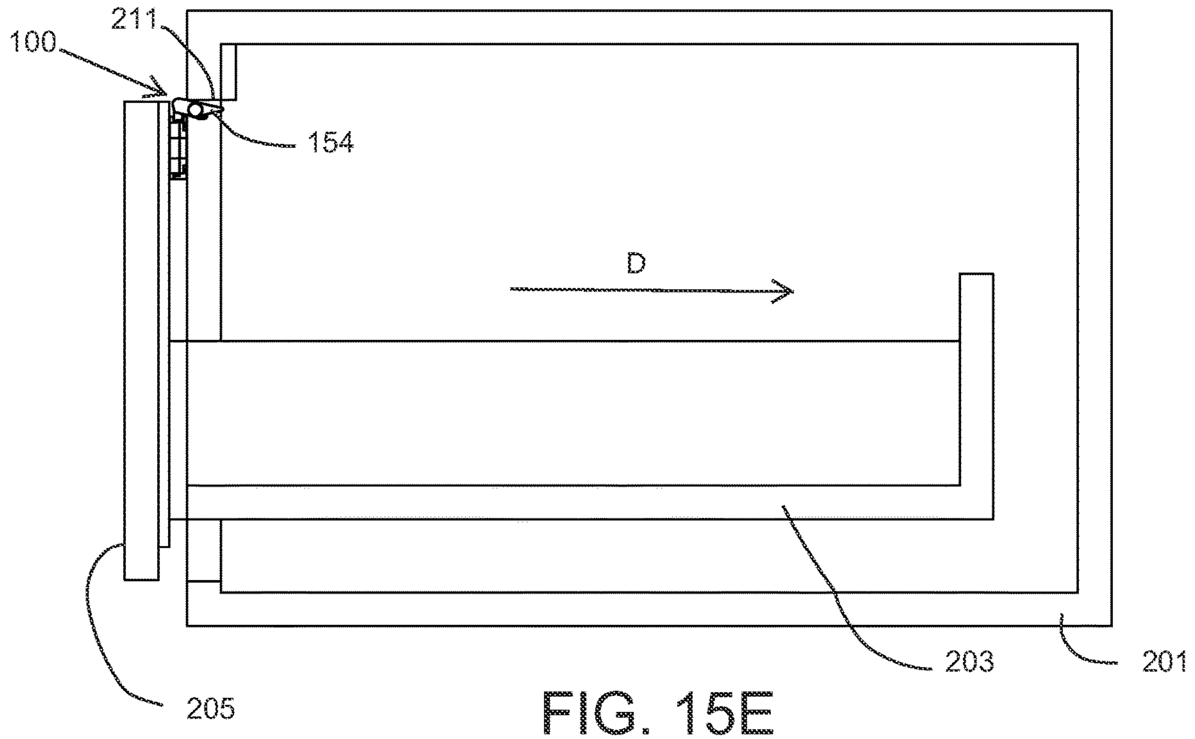

FIG. 15D-15G illustrate cross-sectional views of a structure including a multi-axis latchbolt lock assembly where the structure makes contact with a bolt of the multi-axis latchbolt lock assembly. In FIG. 15D, the latching wedge 154 makes contact with another portion 211, e.g., an edge, of structure 201. As shown in FIGS. 15D and 15E, the latching wedge 154 rotates as the drawer 203 moves in the direction of arrow D to conform to edge 211, i.e., surface 182 of latching wedge 154 conforms to the edge 211. Additionally, as latching wedge 154 rotates, bolt member 152 is biased downward against springs 107 in the direction of arrow.

Figure 15F:
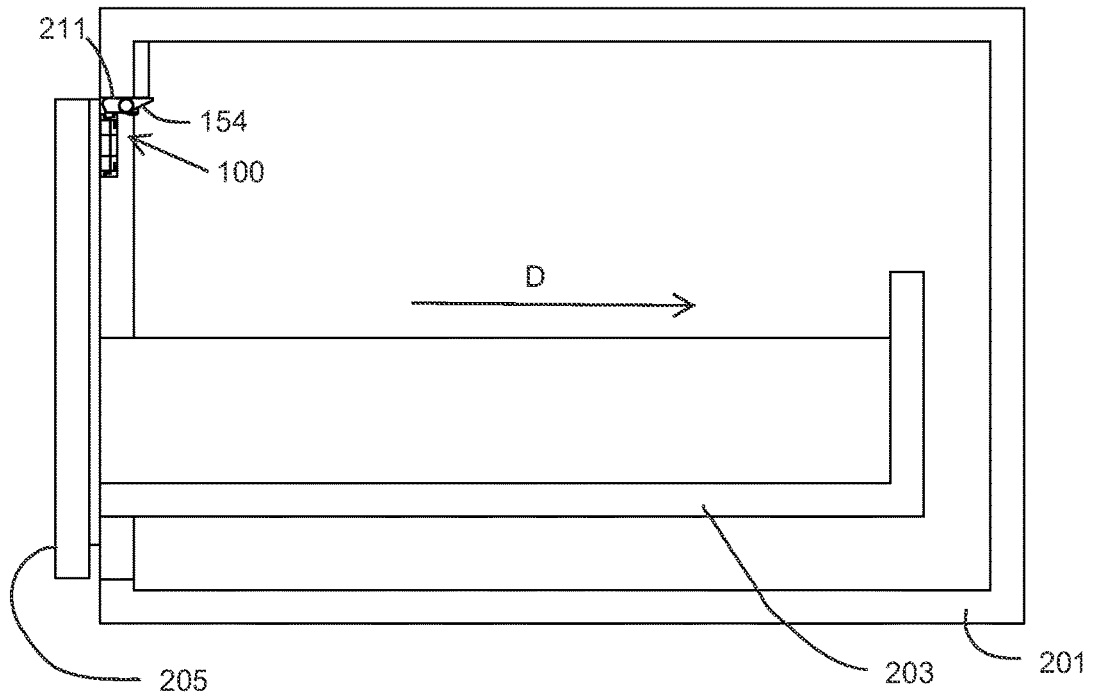
Figure 15G:
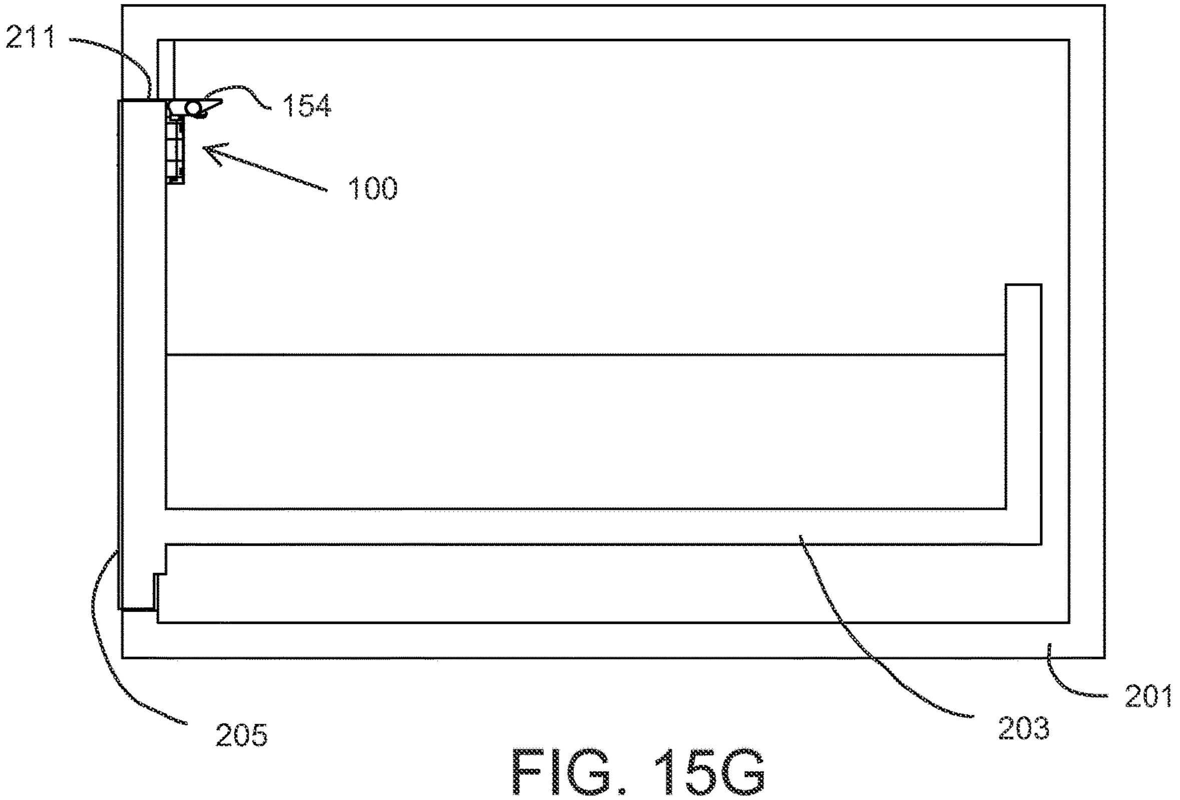

FIGS. 15F and 15G illustrate the lock assembly 100 where the bolt 106 is vertically depressed and the latching wedge 154 is rotationally depressed, similar to that shown and described in relation to FIGS. 13B-1, 13B-2, 14B-1 and 14B-2.

Figure 15H:
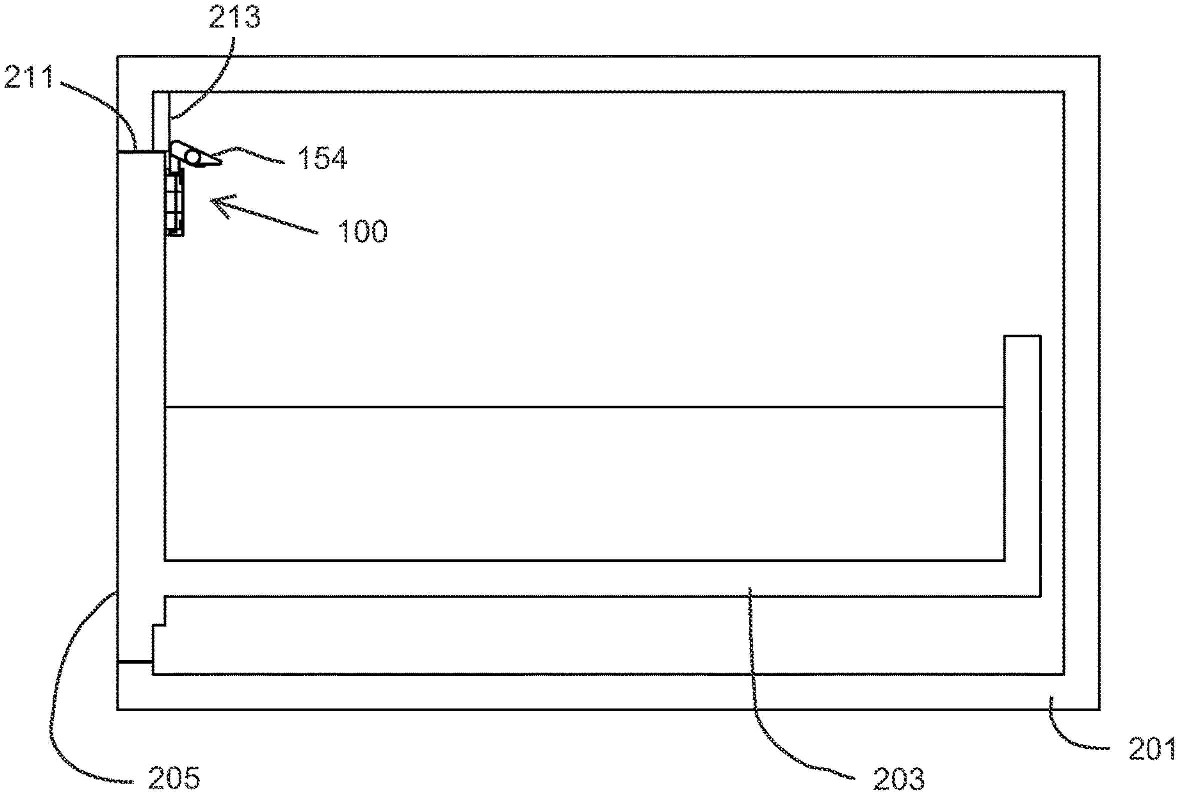
FIG. 15H is a cross-sectional view of a structure including a multi-axis latchbolt lock assembly with a drawer completely within the structure in accordance with an embodiment of the present disclosure.

FIG. 15H is a cross-sectional view of the structure 201 including a multi-axis latchbolt lock assembly 100 with the drawer 203 completely within the structure 201. In FIG. 15H, the latching wedge 154 has cleared the edge 211 allowing the bolt member 152 to return to the normal state, as shown in FIGS. 13A-1, 13A-2, 14A-1 and 14A-2. The latching wedge 154 is no longer aligned with edge 211 and will come into contact with portion 213 of structure 201 if the drawer 203 is moved in a direction opposite arrow D thus effectively locking the drawer 203.

Figure 15I:
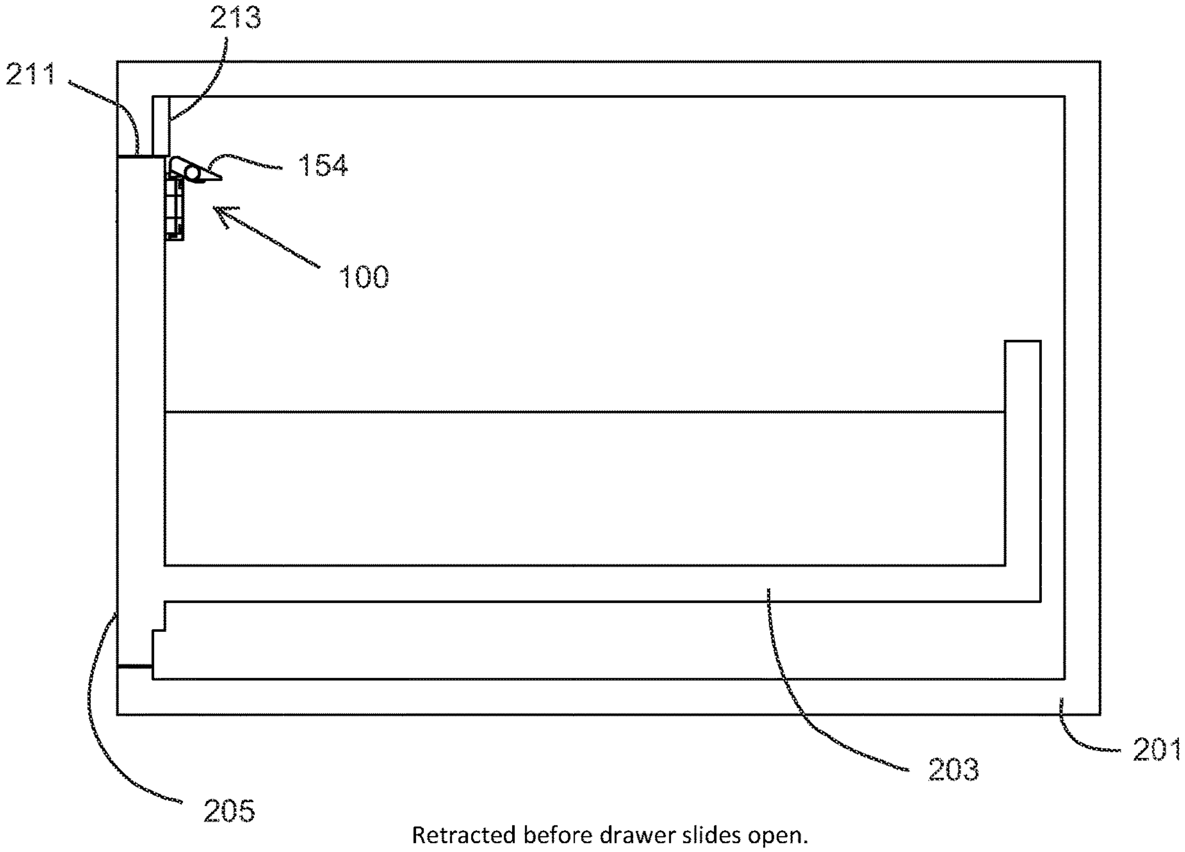
FIG. 15I is a cross-sectional view of a structure including a multi-axis latchbolt lock assembly where a bolt of the multi-axis latchbolt lock assembly is retracted before opening a drawer of the structure in accordance with an embodiment of the present disclosure.

FIG. 15I is a cross-sectional view of the structure 203 including a multi-axis latchbolt lock assembly 100 where a bolt 106 of the multi-axis latchbolt lock assembly 100 is retracted before opening a drawer 203 of the structure 201. Upon activation of the lock actuation member by an appropriate key, the bolt 106 is vertically depressed and the latching wedge 154 remains in its normal state, as shown in FIGS. 13C-1, 13C-2, 14C-1 and 14C-2. The latching wedge 154 is now below edge 211, as shown in FIG. 15I, enabling the drawer to be opened, i.e., the drawer 203 may be moved in a direction opposite of arrow D, where arrow D is shown in FIGS. 15D-15F.

It is to be appreciated that the housing and barrel of the locking device of the present disclosure may take many forms and shapes and still will remain with the scope of the present disclosure. For example, the barrel may be at least one of a cylindrical barrel, an oval barrel, a faceted barrel and/or a rectangular barrel. Additionally, the housing may be at least one of a rectangular housing and/or a faceted housing.

It is to be appreciated that the housing and barrel of the present disclosure may take many forms and shapes and is not to be limited to the embodiments shown herein.

It is to be appreciated that the various features shown and described are interchangeable, that is a feature shown in one embodiment may be incorporated into another embodiment.

While the disclosure has been shown and described with reference to certain preferred embodiments thereof, it will be understood by those skilled in the art that various changes in form and detail may be made therein without departing from the spirit and scope of the disclosure. For example, while a key removable core has been shown and described, it is to be appreciated that the present disclosure contemplates using other various types of locking actuation member such as cores and/or cylinders including, but not limited to, small format interchangeable cores (SFICs), large format interchangeable cores, full size interchangeable cores, a fixed cylinder, etc. It is further to be appreciated that the housings and drivers in accordance with the spirit of the present disclosure may be modified to incorporate future or to-be-invented cores and/or cylinders. In addition to cores and/or cylinders, the present disclosure contemplates that the housings and drivers in accordance with the spirit of the present disclosure may be modified to incorporate future or to-be-invented locking actuation members that function similarly to cores and/or cylinders.

Furthermore, although the foregoing text sets forth a detailed description of numerous embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. A drawer lock assembly comprising:

a housing having a front face and a rear face separated by a predetermined width;

a barrel having a first end extending perpendicularly from the front face of the housing and a second end extending through the rear face of the housing;

a locking actuation member disposed through the first end of the barrel;

a driver disposed through the second end of the barrel to engage the locking actuation member;

a bolt including a bolt member and a latching wedge, a first portion of the bolt member disposed in the housing in parallel with the front and rear face, a second portion of the bolt member coupled to the latching wedge in a generally perpendicular relationship, the latching wedge being rotatable relative to the bolt member;

at least one first spring configured to bias the bolt member and latching wedge to extend from the housing;

an endplate configured to retain the driver, bolt and at least one first spring in the housing, the endplate including a recess configured to receive the bolt member;

wherein upon the latching wedge making contact with a surface of a structure, the latching wedge rotates to conform to the surface the structure and the bolt member is biased against the at least one first spring retracting the bolt member into the housing, and wherein upon actuation of the locking actuation member by a key, the driver interacts with the bolt member to retract the bolt member into the housing.

2. The drawer lock assembly of claim 1, wherein the rear face of the housing further includes a recess configured to receive a portion of the bolt member.

3. The drawer lock assembly of claim 2, wherein the recess further includes two semi-circular depressions configured to receive and house the driver.

4. The drawer lock assembly of claim 1, wherein the driver includes a first surface and a second surface, the first surface including a slot that is configured to receive a member of locking actuation member, the second surface including cam configured to interact with the bolt to move the bolt into a locked or unlocked position.

5. The drawer lock assembly of claim 4, wherein the first portion of the bolt member having a first end and a second end and second portion fixed in a generally perpendicular relationship to the second end of the first portion, the first portion includes an aperture configured to receive the cam of the driver.

6. The drawer lock assembly of claim 5, wherein the second portion of the bolt member includes a first arm including a first arm aperture and a second arm including a second arm aperture, the first and second arm apertures are configured to receive pin to rotatably couple the latching wedge to the bolt member.

7. The drawer lock assembly of claim 6, wherein the second portion further includes a ledge coupled to ends of the first and second arms, the ledge configured to limit the motion of the latching wedge.

8. The drawer lock assembly of claim 7, further comprising at least one second spring disposed about the pin to bias the latching wedge to be in contact with the ledge of the bolt member.

9. The drawer lock assembly of claim 5, wherein the first portion of the bolt member further includes a notch on a side portion adjacent the aperture, the notch configured as a controlled range guide for an allowed motion of the bolt member.

10. The drawer lock assembly of claim 9, further comprising a detent that extends into the recess of the endplate, the detent configured to be disposed in notch of the bolt member to limit the motion of the bolt.

11. The drawer lock assembly of claim 1, wherein the endplate includes at least one slot configured to receive the at least one first spring.

12. The drawer lock assembly of claim 1, wherein the barrel is a cylindrical barrel.

13. The drawer lock assembly of claim 1, wherein the barrel is an oval barrel.

14. The drawer lock assembly of claim 1, wherein the barrel is a faceted barrel.

15. The drawer lock assembly of claim 1, wherein the barrel is a rectangular barrel.

16. The drawer lock assembly of claim 1, wherein the housing is at least one of a rectangular housing and a faceted housing.

17. The drawer lock assembly of claim 1, wherein the locking actuation member is at least one of a small format interchangeable core, a key removable core, a large format interchangeable core, a full-size interchangeable core and/or a fixed cylinder.

18. A multi-axis latchbolt lock assembly comprising:

a housing having a front face and a rear face separated by a predetermined width, the housing configured to be coupled to a movable portion of a structure;

a bolt including a bolt member and a latching wedge, the bolt member coupled to a the latching wedge in a generally perpendicular relationship, the latching wedge being rotatable relative to the bolt member and the bolt member slidingly disposed in the housing in parallel with the front and rear face;

at least one first spring disposed in the housing and configured to bias the bolt to extend from the housing into a first position; and a locking actuation member disposed in the housing and coupled to the bolt;

wherein upon the latching wedge making contact with another portion of the structure, the latching wedge rotates to conform to a surface of the another portion of the structure and the bolt member is biased against the at least one first spring such that the bolt member is retracted into a second position in the housing, upon the latching wedge clearing the another portion of the structure, the bolt member is extended back into the first position, and wherein upon actuation of the locking actuation member by a key, the locking actuation member interacts with the bolt member to retract the bolt member into the housing into the second position.

19. The multi-axis latchbolt lock assembly of claim 18, wherein the housing includes a barrel disposed on the front face for coupling the housing to the structure, the barrel being at least one of a cylindrical barrel, an oval barrel, a faceted barrel and/or a rectangular barrel.

20. The multi-axis latchbolt lock assembly of claim 18, wherein the locking actuation member is at least one of a small format interchangeable core, a key removable core, a large format interchangeable core, a full-size interchangeable core and/or a fixed cylinder.

* * * * *